United States Patent [19]

Mehnert

[11] Patent Number: 4,807,149
[45] Date of Patent: Feb. 21, 1989

[54] MEASURING ARRANGEMENT WITH A PLURALITY OF MEASURING UNITS

[75] Inventor: Walter Mehnert, Ottobrunn, Fed. Rep. of Germany

[73] Assignee: MITEC Moderne Industrietechnik GmbH, Ottobrunn, Fed. Rep. of Germany

[21] Appl. No.: 889,065

[22] Filed: Jul. 24, 1986

[30] Foreign Application Priority Data

Jul. 26, 1985 [DE] Fed. Rep. of Germany ....... 3526839

[51] Int. Cl.⁴ .............................................. H04Q 9/14
[52] U.S. Cl. .................................. 364/505; 340/825.04
[58] Field of Search .............. 364/505, 145, 493, 557; 165/12; 236/46 R, 1 B, 57; 340/825.04, 825, 825.03, 825.14

[56] References Cited

U.S. PATENT DOCUMENTS

| | | | |
|---|---|---|---|
| 3,825,733 | 7/1974 | White et al. ........................ | 364/537 |
| 4,153,945 | 5/1979 | Actor et al. ........................ | 364/900 |
| 4,155,075 | 5/1979 | Weckenmann et al. ......... | 340/167 R |
| 4,160,238 | 7/1979 | Weckenmann et al. ......... | 340/147 R |
| 4,161,880 | 7/1979 | Prosky ............................... | 364/557 |
| 4,209,840 | 6/1980 | Berardi et al. ..................... | 364/200 |
| 4,276,925 | 7/1981 | Palmieri ............................. | 236/46 R |
| 4,382,544 | 5/1983 | Stewart ............................... | 165/12 |
| 4,480,312 | 10/1984 | Wingate ............................. | 364/557 |
| 4,497,031 | 1/1985 | Froehling et al. ................. | 364/557 |
| 4,527,247 | 7/1985 | Kaiser et al. ....................... | 364/506 |
| 4,657,179 | 4/1987 | Aggers et al. ..................... | 236/51 |
| 4,661,914 | 4/1987 | Mulokey et al. .................. | 364/505 |

Primary Examiner—Parshotam S. Lall
Assistant Examiner—S. A. Melnick
Attorney, Agent, or Firm—Sughrue, Mion, Zinn, Macpeak & Seas

[57] ABSTRACT

The measuring units of a measuring system are combined in groups each with a respective selecting unit. A cable, into which the measuring and selecting units are integrated, connects these one with the other and with a central control unit which, by emission of encoded selecting unit setting and address signals activates the selecting units individually so that these prepare the measuring units of their group for the reception of measuring unit setting and address signals from the cental control unit. The address signals each consist of respective pulse sequences which are decoded by programmed reception circuits. The pulses for the measuring units differ from the pulses for the selecting units by their pulse width. Employed as measuring sensors are current sources which on activation of their measuring unit are connected to a voltage supply and thereupon impress a measurement current, which varies with the magnitude to be measured, into a measurement line wire of the cable leading to the central control unit. The measuring and selecting units comprise current-limiting and buffer curcuits, which limit short-circuit currents and even out the current loading of the cable. Signal-shaping circuits in the selecting units prepare the pulses and feed them into the next line portions.

6 Claims, 10 Drawing Sheets

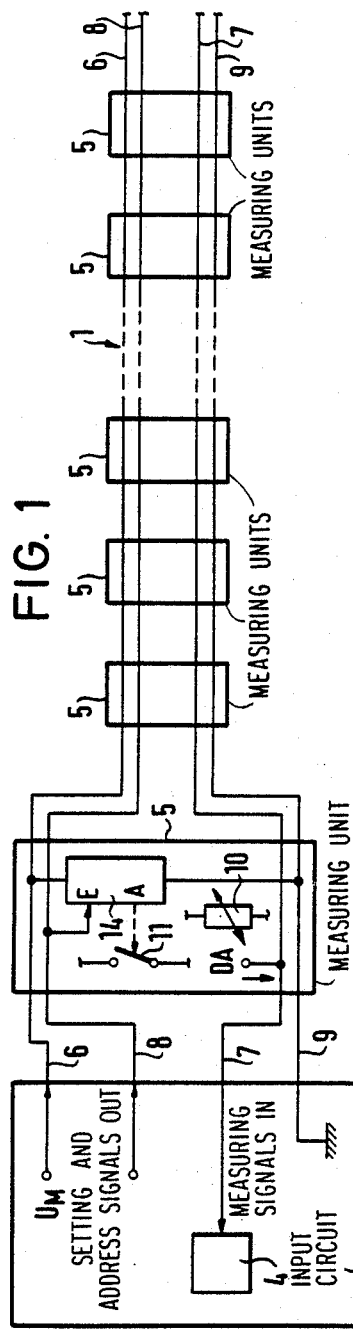

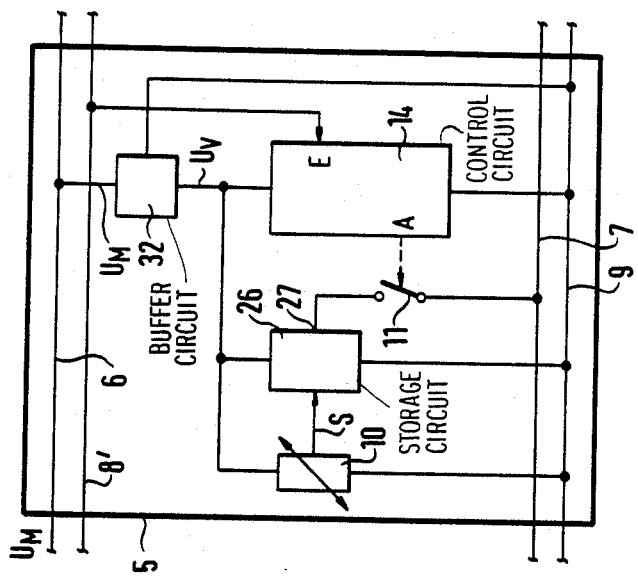
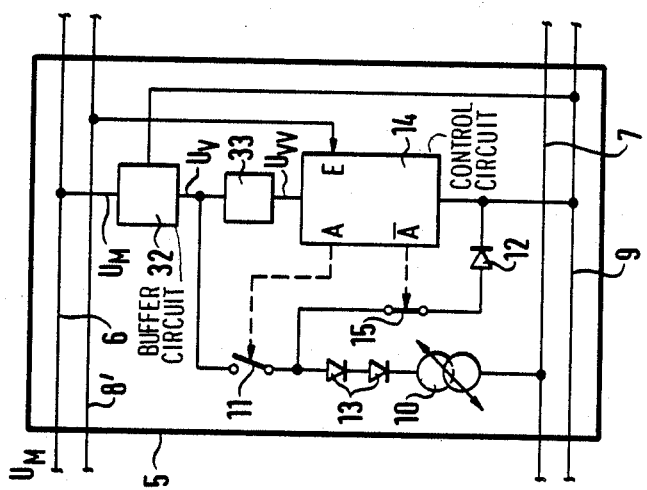

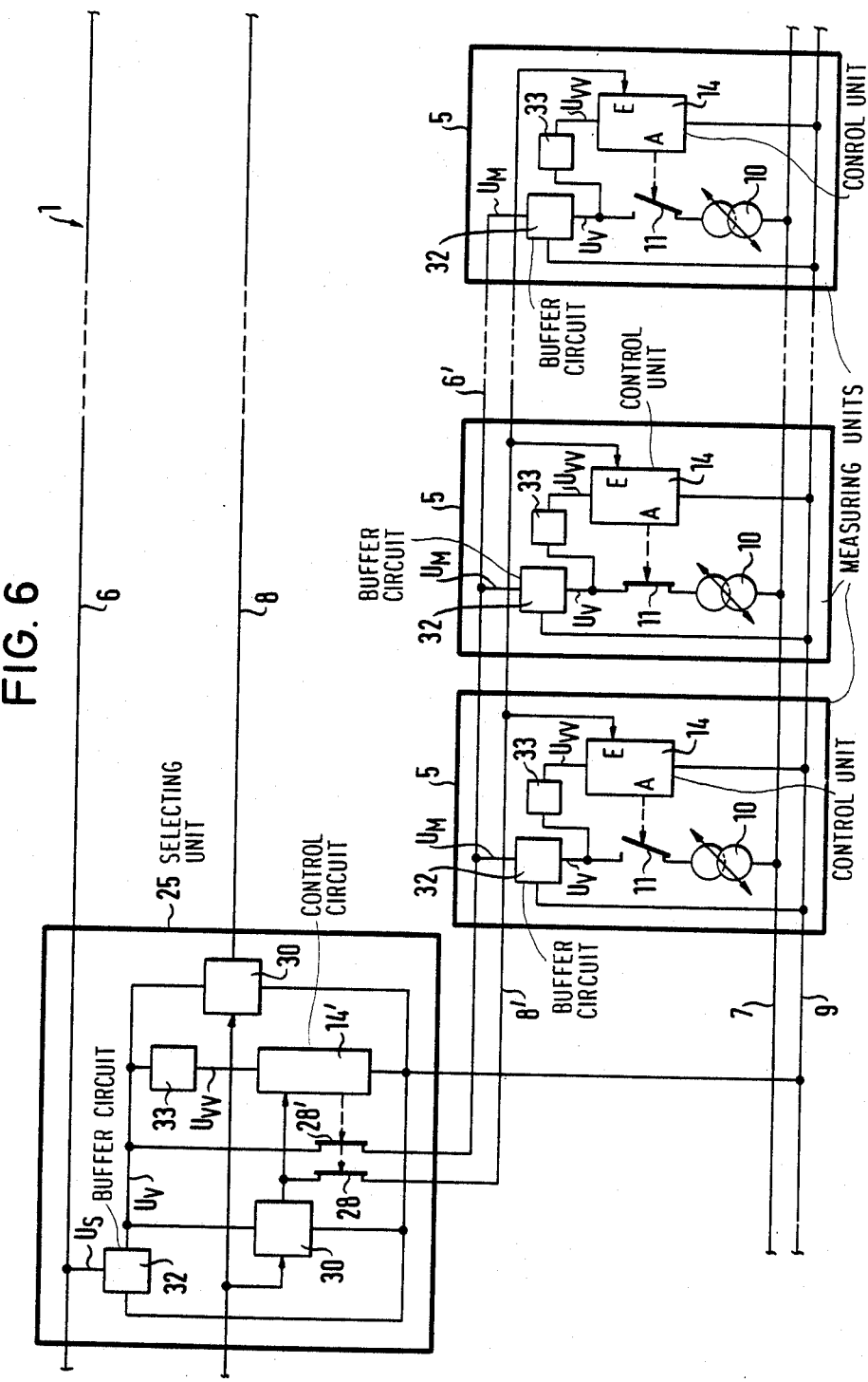

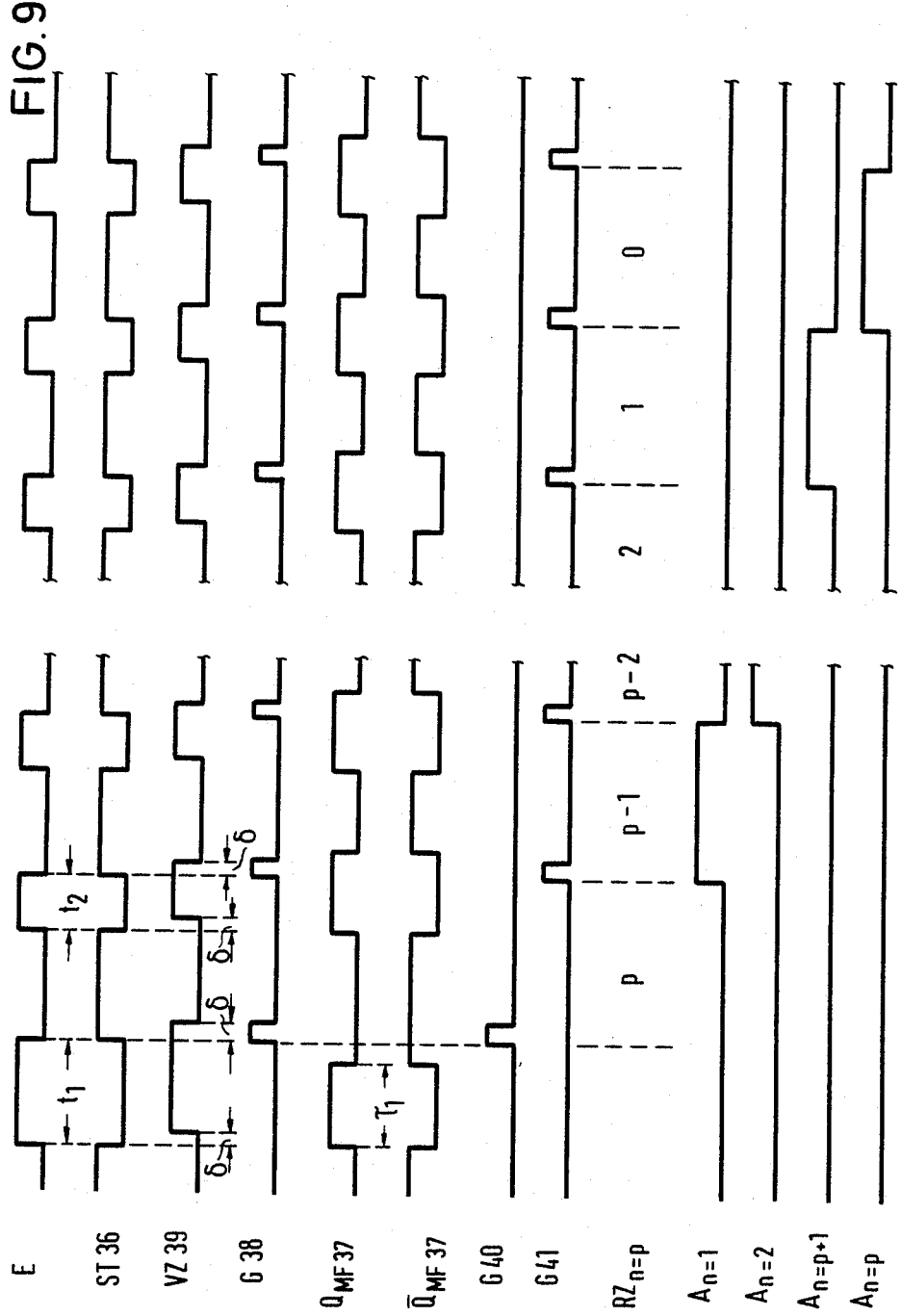

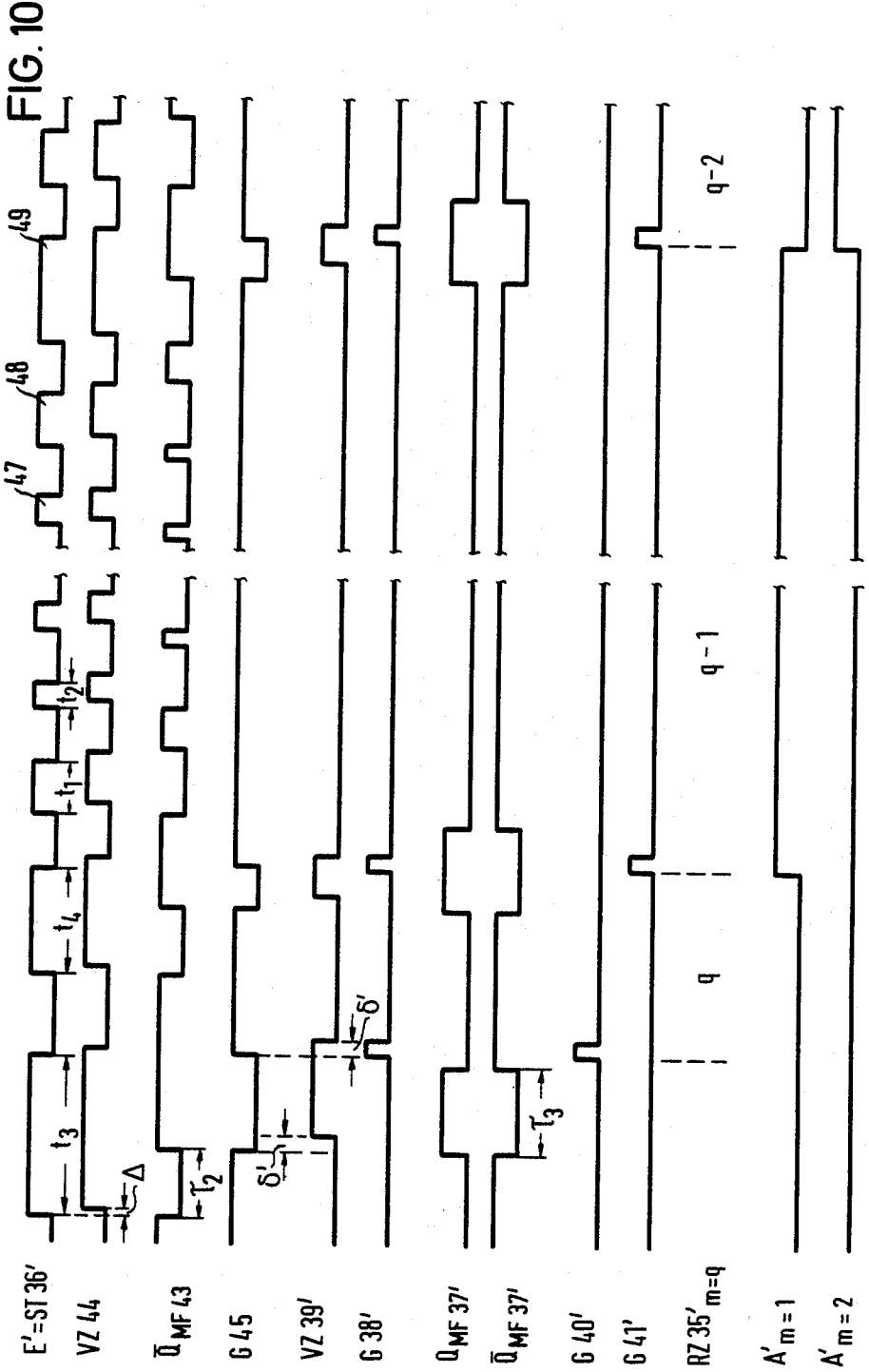

MEASURING ARRANGEMENT WITH A PLURALITY OF MEASURING UNITS

FIELD OF THE INVENTION

The invention concerns a measuring system with a plurality of measuring units.

BACKGROUND OF THE INVENTION

An important example of application for such a measuring system, as it is for example known from the German published patent application No. 30 25 837, is represented by measuring cables. In these cables, the components of each measuring unit as well as the components of selecting units, which each serve for the control of a respective cable portion, are miniaturised to such an extent that they can be integrated in the cable in the form of integrated circuits or hybrid circuits. Thereby, these units do not need any housing of their own.

The measuring sensors can be of quite diverse kind. For example, it is known to use thermistors as measuring sensors and to arrange the measuring units in the cable at spacings of only one meter. A cable equipped in such a manner can for example be disposed along a remote heating duct in order to monitor this. If the medium transported in the duct issues by reason of a leakage into the environment, then the temperature conditions change locally. This can be recognised through evaluation of the changed measurement values which the measuring units produce in immediate proximity of the leakage and deliver to a central control unit. In that case, the measurement values are detected with identification of the measuring unit, from which they originate. Thereby, a very accurate location-finding of an arisen leakage is possible at the same time.

Further fields of application for measuring systems of that kind result when measuring sensors for other environmental parameters are employed in place of temperature-dependent components. Thus, there are for example measuring sensors which produce an electrical signal which alters in dependence on environmental pressure or the ambient magnetic field or the ambient moisture and so forth. It is also not at all necessary that all measuring units are equipped with like measuring sensors. Thus, the temperature, the air humidity, the operational state of the illumination, the development of smoke and so forth let themselves be monitored in a plurality of rooms in a building complex which comprises many rooms and in which such a measuring system is installed. For this purpose, at least one measuring unit equipped with an appropriate measuring sensor is provided in each of the rooms concerned for one, more or each of these physical environmental parameters. All these measuring units are connected one with the other by means of the cable of the measuring system and can thus be interrogated in sequence from the central control unit.

In the case of the initially mentioned, known measuring system, the control circuit of each measuring unit preferably consists of a bistable trigger stage (flip-flop). The flip-flops of the measuring units of entire cable portions are connected one with the other into a shift register by a length of a special wire of the cable. For the performance of a measuring cycle in the cable portion concerned, a single preset binary value, for example a single logic "1" is fed into the input of the shift register. With the aid of a clock signal, which goes from the central control unit to all measuring units, this preset binary value is then advanced from measuring unit to measuring unit. The appearance of the preset binary value at an output of the flip-flop of a measuring unit leads to the closing of the associated switch arrangement. In this manner, the switches of the measuring units are then under the control of the central control unit closed in sequence for the time span between two clock pulses and then again opened. Disposed at the beginning of each cable portion is a selecting unit which can be activated with the aid of a coded address signal by way of an individual wire of the cable from the central control unit. In the activated state, the selecting unit then takes care that the preset binary value is fed into the shift register of the pertinent cable portion. During the switching-on of the system as well as also during the operation, it must be made certain that only a single measuring unit at a time generates a measurement signal. For this purpose, a resetting signal is feedable to the selecting units as well as also to the measuring units, with the aid of which resetting signal all selecting units are deactivated and all measuring unit flip-flops are reset into that state before each measuring cycle, in which their associated switch arrangement is opened. These resetting signals are transmitted from the central control unit on an individual wire of the cable to the circuits disposed in the cable. Thus, the known measuring arrangement requires a comparatively large number of cable wires and permits an access to the measuring units only portion by portion. Although the individual cable portions can be selected freely, yet the access to a certain measuring unit within a portion is possible only in the manner that all preceding measuring units are selected first.

An objective of the invention is to provide a measuring system of the initially named kind in which an optimum of possibility of access to the measuring units as well as of reliability is attainable with a smallest possible number of cable wires.

SUMMARY OF THE INVENTION

In practising the invention I proceed from the recognition that only in normal operation the measuring units are caused to close their switch arrangement and to transmit a measurement value to the central control unit in sequence according to a fixedly preset scheme. However, it is also necessary to be able to have access to a special measuring unit outside the usual sequence in special cases, for example when a measurement value occurs, which falls out of line and shall be checked rapidly by performing a renewed measurement.

According to the invention, therefore, each single measuring unit is equipped with an address so that it can be selected from the central control unit. Without further measures, this would however have the consequence, above all in the case of large systems, which can comprise 50,000 or more measuring units, that correspondingly complex address signals would have to be generated and emitted in order to run through a single measuring cycle. This would increase extraordinarily the time duration needed for a measuring cycle.

According to the invention, therefore, the measuring units are arranged to form a plurality of measuring unit groups, each measuring unit group having a selecting unit which, in the same manner as all the measuring units, is arranged remote from the central control unit and is integrated into the cable, by means of which it is connected with all other selecting units of the system as well as with the central control unit.

Each of the selecting units is equipped with an individual address which is different from the addresses of all other selecting units in the system. As a consequence, it can be selected or activated directly from the central control unit which, for this purpose, transmits a corresponding selecting unit address signal. The measuring units of each measuring unit group are so arranged that they can respond to a measuring unit address signal from the central control unit only when the pertinent selecting unit has previously been activated from the central control unit. Since, at any time, always only one single selecting unit is activated, only the measuring units belonging to the same measuring unit group are to be equipped with different addresses, whereas the same measuring unit addresses can be used again and again in the different measuring unit groups. In order to keep the number of wires in the cable as small as possible, the address signals fo the selecting units as well as the address signals for the measuring units are transmitted from the central control unit on one and the same wire of the cable. This wire, which here is called "system command line wire" is also used to transmit two kinds of setting signals, which set the selecting units and the measuring units, respectively, to an initial state from which a system measuring cycle or a respective group measuring cycle, respectively, can be started.

In order to allow to distinguish one from the other these different kinds of signals being transmitted on one and the same wire, they are transmitted from the central control unit in an encoded form and each of the selecting units as well as each of the measuring units is equipped with a signal decoder which decodes and selects the received signals and forwards the appropriate ones to the correct inputs of the other circuits of the selecting and measuring units, respectively, whereas the inappropriate ones are discarded.

In addition to the system command line wire which connects all selecting units with the central control unit the cable comprises a group command line wire which is subdivided into a plurality of parts or lengths each of which belongs to one measuring unit group and connects the measuring units thereof with the pertinent selecting unit, which comprises an ON/OFF switch which is normally open but is closed when the selecting unit is activated by receiving its address signal from the central control unit. In its closed state said ON/OFF switch connects the pertinent length of the group command line wire with the system command line wire so that the measuring units of this measuring unit group can receive and react to the measuring unit setting and address signals emitted by the central control unit during the time span in which the ON/OFF switch is closed.

In a measuring system, having the above features a system measuring cycle is performed as follows:

First of all, the central control unit transmits an encoded selecting unit setting signal bringing the selecting units in the above named initial state in which all of them are "desactivated", i.e. all their ON/OFF switches are open, so that none of the group command line wire lengths is connected with the system command line wire and the signals emitted by the central control unit on this wire can be received by the selecting units only but not by the measuring units.

Secondly, the central control unit emits the first encoded selecting unit address signal which is received and decoded by all selecting units. However, only the selecting unit having programmed the address which is met by this selecting unit address signal is activated thereby so that its ON/OFF switch is closed.

Thereafter, the central control unit emits an encoded measuring unit setting signal which is received and decoded by all selecting units and the measuring units of the activated measuring unit group. This signal is discarded by the selecting units but it sets the measuring units of the activated measuring unit group to an initial state in which they do not yet transmit measuring signals back to the central control unit but are ready to react correctly on measuring unit address signals received therefrom.

The ON/OFF switch of the activated selecting unit still being closed, the central control unit starts emitting a series of encoded measuring unit address signals which, via the system command line wire, are received by all selecting units which decode and discard these measuring unit signals. Via the closed ON/OFF switch of the one activated selecting unit the encoded measuring unit address signals also reach all the measuring units of the activated measuring unit group where they are decoded in order to activate one by one the measuring units the programmed addresses of which they meet. Each activated measuring unit transmits a measuring signal via the system measuring line wire to the central control unit and is deactivated upon receipt of the following measuring unit address signal which is different from its programmed address.

After having finished the just described "group measuring cycle", i.e. after having received a measurement value from each measuring unit of the activated measuring unit group, the central control unit emits a further encoded selecting unit address signal which desactivates the hitherto activated selecting unit, the ON/OFF switch of which is opened, and which activates a further selecting unit to the programmed address of which it corresponds. Then a further encoded measuring unit setting signal is emitted starting a further group measuring cycle as described above.

In the same manner all measuring unit groups are activated and desactivated one by one until finally, at the end of a complete system measuring cycle, the central control unit has received a measuring signal from each of the measuring units of the system.

Immediately thereafter or after any predeterminable time span the next system measuring cycle is started by emitting a further encoded selecting unit setting signal. The time needed for performing a group measuring cycle is very close to the absolute minimum, since the respectively next measuring unit is selected without loss of time and preferably immediately following the performance of a measurement operation. In the same manner the selecting units can be activated and desactivated very quickly one by one. Nevertheless, each measuring unit also still remains freely selectable individually, since it possesses an individual address and the respective measuring unit address signal together with the corresponding selecting unit address signal can be generated and emitted without performing a complete measuring operation for any other measuring unit.

Due to the fact that the measuring units are not coupled one among the other in the manner of a shift register, the cable wire needed for this according to the state of the art becomes redundant. Since furthermore not only the address signals, but also the resetting and setting signals for the measuring units as well as also for the selecting units can be transmitted by way of one and the same cable wire, an extraordinarily small number of cable wires results in the case of a measuring system structure according to the invention.

BRIEF DESCRIPTION OF THE DRAWING

The above and other features and advantages of the present invention will become apparent from the following detailed description which is made with reference to the drawing in which there show:

FIG. 1 a schematic illustration of a simple embodiment of a measuring system,

FIG. 2 a schematic illustration of a more complex embodiment according to the invention, in which side strands each forming a respective measuring unit group are branched off from a main strand with the aid of selecting units, FIG. 3 a schematic illustration of a still more complex embodiment of the system according to the invention, in which also the measuring units of the main strand of the cable are sub-divided into groups with the aid of selecting units, FIG. 4 a first embodiment of a measuring unit according to the invention, FIG. 5 a second embodiment of a measuring unit according to the invention, FIG. 6 a schematic illustration of a group of measuring units with the associated selecting unit in an embodiment which is modified somewhat compared with the groups in the FIGS. 2 and 3, FIG. 7 the schematic illustration of a control circuit as can find use in the measuring units for the reception of the encoded address signals and closing and opening of the switches, FIG. 8 the schematic illustration of a control circuit as can find use in the selecting units for the reception of the encoded address signals and for the opening and closing of the switches, FIG. 9 a pulse diagram for illustration of the manner of function of the control circuit of FIG. 7, FIG. 10 a pulse diagram for illustration of the manner of function of the control circuit in FIG. 8, FIG. 11 a receiving circuit as can find use in the central control unit for the reception and amplification of the measurement signals coming from the measuring units, FIG. 12 a first embodiment of a current-limiting and buffer circuit as can find use in the current supply of each measuring unit and each selecting unit, FIG. 13 a further embodiment of a measuring unit which is designed for particularly high reliability requirements, FIG. 14 a signal-shaping circuit for the regeneration of the address signals, FIG. 15 a pulse diagram for explantion of the propagation of the address signals on the group command line wire lengths, FIG. 16 a delay circuit as can be used between the output of each control circuit in the measuring units and the selecting units and the respectively following switch or switches.

DESCRIPTION OF PREFERRED EMBODIMENTS OF THE INVENTION

Figure 3:
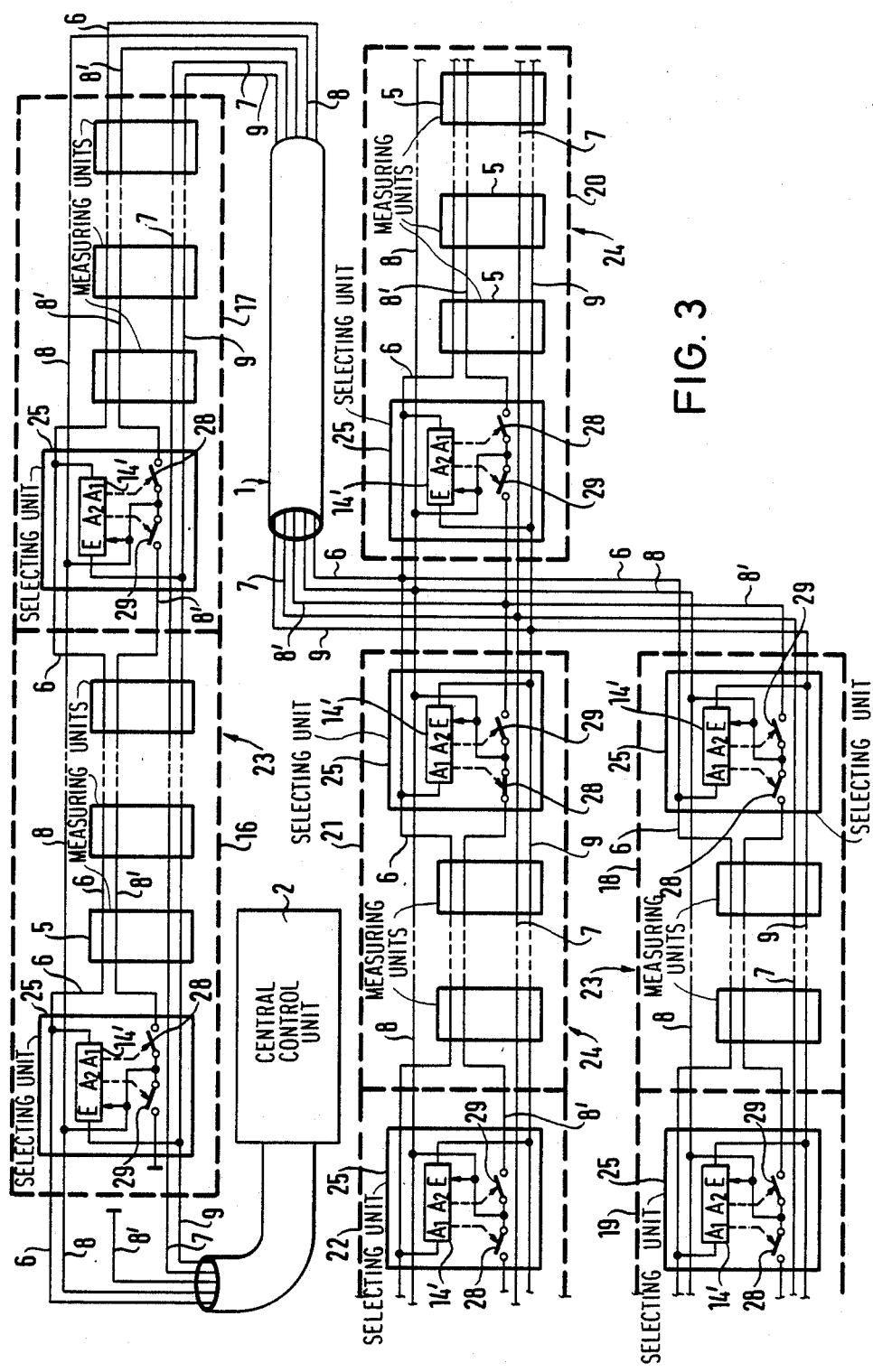

In FIG. 1, there is illustrated a simple embodiment of a measuring arrangement, in which a four-wire cable 1 connects a plurality of measuring units 5 one with the other and with a central control unit 2, from which the measuring units 5 are drivable individually. Such an arrangement is suitable for small systems with at most some few thousand measuring units which are integrated in the cable, i.e. enclosed and protected against damaging environmental influences by the cable sheath.

Of the four wires of the cable 1, one wire 6 serves as system voltage supply line in order to feed a supply voltage $U_M$ from the central control unit 2 to the measuring units 5, whilst a wire 9 serves as system ground line which connects the measuring units with the system ground in the central control unit 2.

Each measuring unit 5 comprises at least one measuring sensor 10, one switch 11 and one control circuit 14. Since these components of each measuring unit 5 can according to embodiment be connected one with the other in different manner, they are in FIG. 1 represented only schematically one beside the other in the first measuring unit 5. Different preferred embodiments of such measuring units 5 are explained more exactly further below with reference to the FIGS. 4, 5, 6 and 13.

It is common to all these embodiments that each control circuit 14 comprises a programmable address recognition circuit which is connected by way of a command input E with a wire 8 of the cable 1. On this wire 8 serving as command system line, the central control unit 2 sends out encoded measuring unit address signals which are received and decoded by the programmable address recognition circuits. In the example of embodiment illustrated in FIG. 1, the address recognition circuit of each measuring unit 5 is programmed for a different address. If a measuring unit address signal emitted by the central control unit 2 coincides with the programmed address of a certain measuring unit 5, then the control circuit 14 of this measuring unit at its output A generates an activation signal, through which the switch 11, which is open in the rest state, is closed for a predetermined time interval and then again opened. This is indicated by the dashed arrow line from the output A to the switch 11.

Although the switch 11 is always illustrated as mechanical switch in the figures, electronic switches are yet used preferably. This is explained more exactly further below.

Finding application as measuring sensors 10 can be the most diverse sensors which produce an electrical output signal which changes its value in dependence on an environmental parameter, such as for example the temperature, the brightness or the moisture. Through the closing of the switch 11, either this electrical output signal itself or another electrical signal characterising the magnitude of the output signal is applied as measurement signal to the data output DA of the measuring unit concerned. This data output DA is connected by way of a wire 7, which finds use as system measurement line, with the central control unit 2, in which the measurement signal coming from the respectively driven measuring unit is received with the aid of an input circuit 4, amplified and fed to a further evaluation. A particularly preferred embodiment of such an input circuit 4 is explained further below with reference to FIG. 11.

Since the system measurement line 7 is formed by only a single wire of the cable 1, on which several measuring signals can not be transmitted simultaneously to the central control unit 2, the measuring units 5 are selected one by one so that always only one of the switches 11 is closed. When the measurement signal of a selected or activated measuring unit 5 has been detected in the central control unit 2, then the switch 11 concerned can again be opened and another measuring unit 5 be selected for the closing of its switch 11.

In the regular case, a measuring system of that kind operates cyclically, i.e. starting with a first measuring unit, the measuring units 5 are selected in sequence for the closing of the respective switch 11 until an actual measurement value has been detected from each measuring unit and a complete measuring cycle has thereby been concluded. Hereupon, a new measuring cycle can follow immediately or after a preset pause.

Although it is expedient in the performance of such a measuring cycle that the central control unit 2 "knows" at every instant exactly from which measuring unit the instantaneously detected measurement value originates, an absolutely freely selectable access to any desired measuring unit at any desired instant is however not required.

The address signals for the measuring units 5 are therefore so structured that the address signal of the $n^{th}$ measuring unit in the selection sequence consists of the address signal of the preceding measuring unit, i.e. that of the $(n-1)^{th}$ measuring unit, and an additional signal and in its turn yields the address signal of the $(n+1)^{th}$ measuring unit thereby, that a further additional signal is added to it.

For running through a measuring cycle, the central control unit need thus deliver by way of the command line 8 only the address signal of the measuring unit last in the selection sequence, since this address signal comprises the address signals of all other measuring units. In this manner, all measuring units 5 are during the running-through of a measuring cycle selected for the closing of their respective switch 11 in a sequence preset by their programming.

In spite of this strict selection sequence intended for the "normal case", it is also possible directly to select individual measuring units 5 freely, i.e. without preceding selection of other measuring units, due to the fact that the address signal of the measuring unit, which in the selection sequence precedes the desired measuring unit, is produced and emitted so rapidly that insufficient time remains for all the measuring units preceding the desired measuring unit to close their switches 11 so that they are practically passed over. Only the additional signal, which makes the address signal of the desired measuring unit out of the address signal of the directly preceding measuring unit, is produced and emitted with a length in time which enables the desired measuring unit to deliver a measurement signal to the central control unit 2.

It is important that an exactly defined selection of the measuring units is possible from the central control unit 2 with the aid of a single wire, namely the command line 8 of the cable 1, through the structure, of the measuring unit address signals and address recognition circuits. Altogether, a minimum wiring effort results in this manner for the connection of all measuring units 5 with the central control unit, since only a single cable with altogether four wires is required for this. It is expressly pointed out in this context that all wires of the cable inclusive of the voltage supply line 6 and the ground line 9 are illustrated in FIG. 1 as also in the other corresponding figures. Thus, an optimum possibility of access to the individual measuring units with minimum wiring effort at the same time is thus attained here.

Illustrated in FIG. 2 is a somewhat more complex measuring arrangement, in which a main strand 23 of the cable 1, apart from a plurality of measuring units 5, comprises a series of selecting units 25, which are connected through the main strand 23 just as the measuring units 5 one with the other and with the central control unit 2.

The measuring units 5 are here built up just as the measuring units 5 of FIG. 1 and are therefore now only illustrated as rectangular blocks.

Branched off from the main strand 23 of the cable 1 at each selecting unit 25 is a side strand 24, which in its turn comprises only measuring units 5. Concerned in this case is a measuring system of medium size, in which maximally some few thousand measuring units are provided each in the main strand 23 as well as also in each of the side strands 24.

A direct selection of each individual measuring unit 5 from the central control unit is no longer advantageous in a system of this size. For such a direct selection, too great a programming and decoding effort would have to be operated in order to allocate an individual address to each measuring unit.

In order to avoid this, the measuring units 5 indeed possess addresses which are different one from the other within each side strand 24, but these addresses are repeated from side strand to side strand. Thus, for example, there is a measuring unit 5 with the address 1, a measuring unit 5 with the address 2 and so forth in each side strand 24. The side strands need not necessarily comprise the same number of measuring units 5. It is assumed here that the side strand with the most measuring units 5 altogether comprises p measuring units; then, the greatest side strand measuring unit address is equal to p.

The measuring units 5 arranged in the main strand 23 thereagainst possess addresses which are different one among the other as well as also from the addresses of the measuring units 5 in the side strands. If the main strand comprises q measuring units, then their addresses run for example from $p+1$ to $p+q$.

In order that the switch 11 is closed in only a single measuring unit 5 at a time in one of the side strands 24 on the emission of an address signal, which is smaller than or equal to p, each of the selecting units 25 comprises at least one switch 28, which is open in the rest state, i.e. when the selecting unit 25 is not selected. Thereby, the group command line 8' of each side strand 24 is normally separated from the system command line 8 of the main strand. Beyond that, a second switch 28' is preferably provided, which is opened and closed simultaneously with the switch 28 and serves in the rest state of the selecting unit 25 to separate the group voltage supply line 6' of each side strand 24 from the system voltage supply line 6 of the main strand 23; a connection between the command lines 8' and 8 as well as between the voltage supply lines 6' and 6 is produced only when the selecting unit 25 concerned has been activated from the central control unit 2. Thereagainst, the measurement lines 7 and the ground lines 9 of the side strands 24 are constantly connected with the corresponding lines 7 or 9 of the main strand 23.

Although this requires the additional switch 28' in each selecting unit 25, it does however effect two substantial advantages. For one thing, the current consumption of the entire system is reduced appreciably, since always only the measuring units 5 of the main strand 24 as well as of a single side strand 24 take current. Thereby, the cross-section of the wires 6 and 9 can be kept small and large measuring systems can be built up without the supply current flowing by way of the cable 1 causing too great a voltage drop. For the other thing, the operational reliability of the system is increased. Through the switching-off of the side strand command lines 8' and the side strand voltage supply lines 6' of all inactive side strands 24, these side strands are namely put at standstill completely. In connection with the mutual decoupling, according to the invention, of the lines 7 and 9 explained more closely below, this leads to no kind of disturbances being brought into the system by the shut-down side strands 24.

For the control of the switches 28 and 28', each selecting unit 25 comprises a control circuit 14', which in its build-up and in its function largely corresponds to the control circuit 14 of the measuring units 5. In particular, every control circuit 14' likewise comprises a programmable address recognition circuit which by way of a command input E' is connected with the system command line 8 of the main strand 23. On this command line 8, the central control unit 2 emits not only the measuring unit address signals, but also the selecting unit address signals which differ from the measuring unit address signals in unambiguous manner as is explained more closely further below. Thereby, measuring units 5 and selecting units 25 can possess like addresses.

If a selecting unit address signal emitted by the central control unit 2 coincides with the programmed address of a certain selecting unit 25, then the control circuit 14' of this selecting unit at its output A' produces a signal, through which the switches 28 and 28' are closed until the central control unit 2 through production of the corresponding measurement unit address signals has activated individual ones or all of the measuring units 5 of the side strand 24 concerned to close and again open their switches 11.

Thereafter, the switches 28 and 28' of the previously selected selecting unit 25 are opened and the switches 28 and 28' of another selecting unit are closed through the emission of the next selecting unit address signal so that the measuring units of another side strand 24 can initially be prepared for the recognition of the measuring unit address signals through a setting signal emitted by way of the command lines 8 and 8' and then be selected with the aid of the same measuring unit address signals which were used also for the selection of the measuring units of the previously activated side strand.

Since the addresses of the side strand measuring units are different from those of the main strand measuring units, the measuring units of the main strand 23 are not selected through these address signals. When the measuring units of all side strands have been interrogated, the central control unit 2 emits the measuring unit address signals p+1 to p+q, through which the measuring units of the main strand 23 are interrogated in sequence without it hereby being able to come to the interrogation of a measuring unit of a side strand.

Also the address signals for the selecting units 25 are so structured that the address signal of the $m^{th}$ selecting unit in the selection sequence consists of the address signal of the preceding $(m-1)^{th}$ selecting unit and an additional signal and in its turn yields the address signal of the $(m+1)^{th}$ selecting unit thereby, that a further additional signal is added to it.

For the performance of a system cycle, the central control unit 2 thus by way of the command line 8 delivers the selecting unit address signal of the last selecting unit 25 in the selection sequence, which comprises the address signals of all other selecting units. In that case, as already mentioned, between the switching-forward from one selecting unit to the next, the measurement unit address signals are delivered each time, which are required for the selection of the measuring units of the side strand concerned. When running through a system cycle, all selecting units 25 are driven in a sequence preset by their programming to close their respective switches 28 and 28'.

It is possible also in the case of the selecting units 25 through a correspondingly rapid emission of the address signal of a desired selecting unit 25 to jump over all preceding selecting units. It is significant in the embodiment reproduced in FIG. 2 that the cable 1 in its main strand 23 as well as also in the side strands 24 each time comprises only four wires. Thus, an optimum possibility of access to the individual measuring units with a minimum wiring effort is attained also in a system of medium size.

Illustrated in FIG. 3 is a still more complexly organised measuring arrangement, in which the continuous main strand 23 as well as also the side strands 24 can possess a substantially greater length than in the case of the example of embodiment according to FIG. 2.

This is attained thereby, that selecting units 25, each of which is associated with all measuring units of a side strand, are provided not only at the branching points.

Rather, the measuring units 5 of the main strand 23 as well as also the measuring units 5 of the side strands 24 are here combined into groups 16, 17, 18 and 19 and 20, 21 and 22, respectively, which are indicated in FIG. 3 by blocks drawn in dashed lines.

Such a measuring system is basically suitable for line lengths up to 50 kilometers or more. If one thus for example presupposes that the spacing of the measuring unit in the cable amounts to about 1 meter and that each group 16 to 22 can comprise about 1000 measuring units, then the main strand 23 of the cable 50 on its own can for example comprise 50 or more groups. This is indicated in FIG. 3 thereby, that the last drawn group 19 of the main strand 23 is reproduced only in part. Thereby, it is to be expressed that a plurality of further groups can still follow this group 19.

The corresponding applies to the side strands 24, of which the one in FIG. 3, beside both the illustrated groups 21 and 22, still comprises a series of further groups. Thereagainst, the second side strand 24, illustrated in FIG. 3, consists of only a single group 20.

A selecting unit 25 is primarily associated with each of the groups 16 to 22. These selecting units 25 each again comprise at least one respective control circuit 14' with a programmed address reception circuit and at least one respective switch 28, which is normally open and can be closed through a activation or control signal which the control circuit 14' delivers at its output $A_1$. In the closed state, the switch 28 connects the group command line 8' of the primarily associated group with the continuous system command line 8 so that measuring unit address signals delivered by the central control unit can get to the measuring units 5 of the group concerned. This is illustrated in FIG. 3 for the group 21. The measuring unit address signals are in this example of embodiment structured just as was explained above in connection with the FIGS. 1 and 2.

It is expressly pointed out that the selecting units 25 in the FIGS. 2 and 3 are illustrated strongly simplified. In fact, these selecting units 25 comprise a series of further circuits as will be explained still more exactly further below.

The measuring units 5 of a group can be selected by a measuring unit address signal of the central control unit 2 only when the primarily associated selecting unit 25 was selected previously and thus the switch 28 of this selecting unit 25 has been closed. The selection of the selecting unit 25 again takes place individually through a selecting unit address signal which has been emitted from the central control unit 2 on the system command line 8 and which is structured just as was explained above with reference to FIG. 2.

The essential difference from the example of embodiment illustrated in FIG. 2 consists in that the measuring units of all groups, thus in particular also the measuring units of the main strand 23, in the example of embodiment according to FIG. 3 can each possess the same addresses, which for example run from 1 to k in each group, when all groups comprises the same number of measuring units. A special role for the measuring units 5 of the main strand 23 is not given here.

This has the consequence that the cable 1 here by comparison to the examples of embodiment of the FIGS. 1 and 2 requires at least one more wire. In the illustrated case, this is the wire subdivided into the group command lines 8'. For the preferred case that the selecting units comprise a further switch 28', which is actuated simultaneously with the switch 28, in order during the selecting of a group not only to connect the group command line 8', but also a group voltage supply line 6' with the central control unit 2 only when this group is selected, the cable 1 must for this switched line 6' likewise possess an additional continuous wire 6 in order that all groups, which seen from the central control unit 2 lie behind the switched-off group, are not separated from the exchange 2 through the switching-off of a not selected group. The additional effort in switches and cable wires required in this case is completely balanced above all for large systems through the advantages already explained in connection with FIG. 2, namely a drastically reduced current consumption and an increased operational reliability. What was said above in the description of these advantages for the side strands 24, applies here in corresponding manner to each of the groups 16 to 22.

In spite of the fact that the measurement cable 1 in the example of embodiment according to FIG. 3 requires at least one wire more than in the examples of embodiment of the FIGS. 1 and 2, the subdivision into individual groups, apart from the reduction of the programming and decoding effort required at the individual measuring units, yields the advantage that the reliability of the arrangement is increased substantially, which is of great significance in particular in the case of measurement cables installed in the soil. Should a defect namely arise at any one of the measuring units, which makes the switched line 8' unusable, then this has an effect only for the group concerned, which can then no longer be switched on, whilst all remaining groups of the system remain fully capable of function.

In the example of embodiment illustrated in FIG. 3, each selecting unit 25 comprises a further switch 29, which through an output $A_2$ of the control circuit 14' can be opened and closed independently of the switch 28. With the aid of this further switch 29, which is open in the normal or rest state, each selecting unit 25 is secondarily associated with the further group apart from the group primarily associated by way of the switch 28.

Thus, the groups 16 or 21 or 18 are secondarily associated respectively with the selecting units 25, which are primarily associated with the groups 17 or 22 or 19. At the illustrated, star-shaped branching point, a multiple secondary association to the selecting units 25 of the groups 18, 20 and 21 results for the group 17.

Understood here under the term "secondary association" is that the further switch 29 provided in each selecting unit 25 in the closed state connects the group command line 8' of the secondarily associated group with the continuous system command line 8.

This results in the possibility of being able to connect the group command line 8' of one group, for example of the group 18, with the system command line 8 even still when the switch 28 of the primarily associated selecting unit 25 no longer lets itself be closed. In such a case, the central control unit in place of the selecting unit address signal of the defective primarily associated selecting unit 25 emits a modified address signal for the secondarily associated neighbouring selecting unit 25. This, by reason of the modification of the received address signal, then closes not the switch 28 for the group 19 primarily associated with it, but the switch 29 for the secondarily associated group 18, the measuring units 5 of which can then again receive and process the measuring unit address signals emitted fom the central control unit 2. If the neighbouring selecting unit receives its address signal in unmodified form, then it closes not the switch 29 for the secondarily associated group 18, but the switch 28 for the primarily associated group 19, the measuring units 5 of which can then be selected from the central control unit 2 in the usual manner.

Through this association of each selecting unit 25 with at least two respective groups, the operational reliability of the entire system is increased substantially, because of the two switches 28 and 29, by way of which the group command line 8' of each group 16, 18 and 21 is connectible with the system command line 8, would both have to fail in order that the group concerned can no longer be selected. In the group 17, apart from the switches 28 of the primarily associated selecting unit 25, even three further switches, namely the switch 29 of the selecting units of the groups 18, 20 and 21, must fail in order that the measuring units 5 of the group 17 can finally no longer be reached from the exchange 2.

When each selecting unit 25 comprises several "primary" switches which are actuated simultaneously with the switch 28 in order to connect several group lines with continuous system command lines or separate them from the latter, then it is expedient for each of these "primary" switches to provide a further "secondary" switch which is then actuable simultaneously with the further switch 29.

It is pointed out that the measuring units 5 as well as also the selecting units 25 can be constructed to be so small that they are fully integrated in the cable 1, i.e. arranged within the cable sheath and connected with the cable wires 6, 7, 8, 8' and 9. In that case, the measuring units 5 can in spite of the subdivision into groups be distributed completely uniformly over the length of the cable 1 so that, in particular also the cable portions which are illustrated in closed shape in FIG. 3, can contain further measuring units or groups of measuring units.

Illustrated in FIG. 4 is a first, particularly preferred concrete embodiment of a measuring unit 5 as can find use in each of the measuring arrangements reproduced in the FIGS. 1 to 3 for the monitoring of the environmental temperature along the cable 1. In this embodiment, the measuring sensor 10 is constructed as temperature-sensitive current source which is connected on the one hand directly with the measurement line 7 and on the other hand by way of two diodes 12 and 13 with the switch 11. When the switch 11 is closed through a signal of the control circuit 14, then it applies a supply voltage $U_V$, which is delivered by the voltage output of a current-limiting and buffer circuit 32, which in its turn obtains its supply voltage $U_M$ by way of the wire 6 of the cable 1 from the central control unit 2, by way of the diodes 12 and 13 to the measuring sensor 10. Build-up and function of this current-limiting and buffer circuit 32 are explained still more exactly further below with reference to the FIGS. 12 and 13.

When the supply voltage $U_V$ is through closing of the switch 11 applied to the temperature-sensitive current source forming the measuring sensor 10, then this sensor impresses a current into the measurement line 7 of the cable 1, the magnitude of which current represents a measure of the environmental temperature of the measuring sensor 10. This current is fed by way of the measurement line 7 as measurement signal to the receiving circuit 4 of the central control circuit unit 2 and is there measured and evaluated as is described still more exactly further below with reference to FIG. 11.

Temperature-dependent current sources of the kind employed here are commercially obtainable under the designation AD 590 of the firm of Analog Devices and possess a sensitivity for example of 1 micro-amp per degree Kelvin. Their employment is to be preferred to the use of thermistors for two reasons. On the one hand, it is in the case of a spatially far extended measuring arrangement not possible to measure the current which flows through a thermistor in the case of an applied defined measuring voltage, because this voltage can be subject to too strong interfering influences. Instead thereof, a defined measuring current must be impressed in a thermistor from the central control unit and the voltage required for this must be measured in the central control unit 2 for the detection of the measurement value. In order to be able to feed the impressed current to the measuring sensor, an individual wire in the cable 1 is needed. This wire can be omitted in the case, preferred according to the invention, of the use of temperature-dependent current sources as measuring sensors 10, since these current sources need merely be connected with the supply voltage in order to deliver a measurement value. For the other thing, a current impression from the central control unit 2 has the disadvantage that when a short-circuit or a current linkage occurs at a single measuring unit, the measuring current arrives only still partially or not at all at the respective just activated measuring sensor, which in every case leads to an incorrect measurement result. Although one can for the avoidance of this error source connect a protective resistor in front of the input for the impressed current present at each measuring unit, this protective resistor however lies in series with the thermistor when the switch 11 is closed and thereby appreciably impairs the accuracy and sensitivity of the temperature measurement aimed at.

The control circuit 14 serving for the actuation of the switch 11 is for current and voltage supply connected on the one hand to the ground line 9 and on the other hand by way of a direct voltage/direct voltage converter or direct voltage regulator 33 to the voltage output of the current-limiting and buffer circuit 32. The direct voltage regulator 33, which is employed as integrated component in chip form, produces from the direct voltage $U_V$, which is delivered from the current-limiting buffer circuit 32, a substantially lower direct voltage $U_{VV}$ for the components of the control circuit 14 described more exactly further below with reference to FIG. 7. This arrangement affords the advantage that the control circuit 14 can be operated with a substantially smaller current consumption than would be the case if it were connected to the higher direct voltage $U_V$ needed for the measuring sensor 10.

Preferably employed as switches 11 are semiconductor switches, the supply voltage of which must however be taken off from the output of the current-limiting and buffer circuit 32, since it comes to damages or destruction in the case of a semiconductor switch when the switched voltage is greater than the supply voltage. The current-limiting buffer circuit 32 also prevents the flowing of too great a current in case it should come to a simultaneous alloying-through of such a switch 11 and the associated measuring sensor 10.

A residual current, which without further measures would get by way of the measuring sensor 10 to the measurement line 7, flows through a semiconductor switch also in the "opened" switching state.

Although the residual current of the semiconductor switch 11 of a single, not activated measuring unit 5 is very small by comparison with the measuring current, which a measuring sensor 10 applied to the supply voltage $U_V$ impresses into the measurement line 7, since however the measuring sensors of many thousand measuring units 5 are in large measuring arrangements connected to the measurement line 7, the sum of this great number of residual currents would so falsify the impressed current of the respective individual activated measuring sensor 10 that a usable measurement would not be possible. In order nevertheless to be able to realise the switches 11 with the aid of semiconductor switches, the measuring unit 5 illustrated in FIG. 4 comprises a second switch 15, with the aid of which that connection of the switch 11, which leads to the measuring sensor 10, can be connected with the ground line 9. The second switch 15 is actuated by way of an output $\overline{A}$ of the control circuit 14 in nonoverlapping manner in anti-phase to the switch 11. When the switch 11 is open, then the switch 15 is thus closed and the residual current flowing through the switch 11 is diverted through the closed switch 15 by way of a diode 12 to the ground line 9 and does not get to the measurement line 7. The second switch 15 can also be a semiconductor switch; a switch is chosen here, which is of the lowest possible resistance in the closed state, in order to be able to conduct the leakage current away well. The diode 12 prevents that current from the ground line 9 flows to the measurement line 7 when, by reason of the current loading in the case of measuring units 5, which are far remote from the central control unit 2, the potential on the ground line 9 becomes positive relative to the potential on the measurement line 7.

When a short-circuit arises by reason of a defect in a measuring sensor 10, then this would without further measures lead to the measurement line 7 being connected in direct conducting manner by way of the second switch 15, which is closed in the rest state of the measuring unit 5 concerned, with the ground line 9. Thereby, a measuring current impressed by another measuring unit 5 could be diverted at least partially into the ground line 9 so that it would no longer get completely to the receiving circuit 4 of the central control unit 2. A usable measurement would then no longer be possible.

In order to prevent that the entire system becomes functionally incapable in this manner through a short-circuit in a single measuring sensor 10, two diodes 13 are so connected in series with the measuring sensor 10 that they prevent the just described flowing-away of measuring currents even when the measuring sensor 10 has a short-circuit. In principle, one diode would suffice for this purpose. Through the series arrangement of two diodes 13, the operational reliability is increased still further, because the just described protective effect would still remain maintained even when one of both the diodes 13 likewise has a short-circuit. Thus, three components of one and the same measuring unit, namely the measuring sensor 10 and both the diodes 13, must here have a sort-circuit in order that the system becomes functionally incapable. This simultaneous failure of three components of one and the same measuring unit is however extremely improbable.

Illustrated in FIG. 5 is a second embodiment of a measuring unit 5, which can likewise find employment in each of the measuring systems shown in the FIGS. 1 to 3. An employment together of measuring unit 5 according to the FIGS. 4 and 5 is also possible. The measuring unit 5 of FIG. 5 is so built up that changes in the environmental parameter detected by the measuring sensor 10 can be registered by it, which are shorter than the time interval, in which a single measuring unit 5 is selected twice during the repeated passing-through of system cycles. If it is to be monitored by a measuring sensor 10, for example, whether a door is opened, then it is quite possible in the case of large measuring systems that a measuring signal "door closed" is obtained each time during the interrogation of the measuring unit 5 concerned in two successive cycles, although the door was opened briefly and then again closed in the meantime.

In order to be able to detect also such changes of the monitored environmental parameter, which are brief by comparison with the duration of a system cycle, the measuring sensor 10 is according to FIG. 5 connected permanently to its supply voltage $U_V$, which is again supplied by a current-limiting and buffer circuit 32, which in its turn receives the measuring unit supply voltage $U_M$ from the wire 6 of the cable. The measuring sensor 10 here, apart from both its current supply connections, possesses a signal connection S, by way of which it delivers a signal, the magnitude of which changes with the environmental parameter to be monitored. This signal is fed to a storage circuit 26, which at its output 27 for example switches over from logic "0" to logic "1" when the signal of the measuring sensor 10 exceeds a preset threshold voltage and which remains in the switched-over state when the measuring sensor signal again falls below the threshold voltage. The output signal of the storage circuit 26, which is likewise connected to the voltage $U_V$, in this case represents the measurement signal which is then fed into the measurement line 7 and passed onto the central control unit 2 when the control circuit 14 at its input E receives the measuring unit address signal, to which its address reception circuit is programmed, and therefore at its output A gives a signal, through which the switch 11 is closed.

After interrogation has taken place, the storage circuit 26 is again reset, which can for example take place through a signal produced on opening on the switch 11.

Measuring sensors are also known (for example so-called Wiegand modules), which do not have to lie at a supply voltage in order to react to a brief change in an environmental parameter, for example of the magnetic field by a permanent change, for example, of their electrical resistance. Such a measuring sensor then at the same time also serves as storage circuit. For interrogation, it is applied to a supply voltage or connected with a current source delivering a constant current such as a measuring sensor 10 of FIG. 4 with the aid of switch 11. The current then flowing through or the voltage dropping across this measuring sensor then serves as measurement value. If it appears that the event to be monitored has occurred, then for example in the case of a Wiegand module, the resistance value, which characterises the "normal" or "rest" state, is again produced through the application of a strong current pulse before the central control unit 2 selects the next measuring unit.

No direct voltage regulator 33 is illustrated in FIG. 5, but it can if desired be provided here just as for the measuring unit 5 in FIG. 4.

Also connected between the measuring sensor 10 and the measurement line 7 can be a voltage-frequency converter which feeds the measurement value in the form of a frequency signal into the measurement line 7.

FIG. 6 shows the first two and the last measuring unit 5 of a measuring unit group as well as the associated selecting unit 25 in an embodiment which departs from the embodiments indicated in the FIGS. 2 and 3.

The cable 1 illustrated in FIG. 6 possesses six wires, of which three are continuous, i.e. without interruption connect all measuring units 5 and/or all selecting units 25 one with the other and with the central control unit 2. These are the system voltage supply line 6, the system measurement line 7 and the system ground line 9. The system command line 8, which connects the selecting units 25 one with the other, in each selecting unit has an interruption, into which a signal-shaping circuit 30 is connected, which prepares the encoded selecting unit and measuring unit address signals, which are fed to it from the central control unit 2 by way of the respectively preceding selecting unit 25, for an orderly transmission to the next selecting unit 25, as is described still more exactly further below.

Both the remaining wires of the cable 1 are subdivided into portions which each extend from a respective selecting unit 25 to the last measuring unit 5 of the associated group and connect all measuring units 5 of the group with the selecting unit 25. These wire portions serve as group voltage supply line 6' and as group command line 8'.

The selecting unit 25 here comprises two switches 28 and 28', which are operated synchronously by the control circuit 14'. Both these switches 28 and 28' are normally open and are closed only when the selecting unit 25 has received the selecting unit address signal preset in it from the central control unit 2, i.e. when the associated measuring units5 shall be interrogated. The switch 28 as in the examples of embodiment of the FIGS. 2 and 3 serves to connect the group command line 8' with the system command line 8. However, the connection of the group command line 8' with the system command line 8 does not take place directly, but by way of a second signal-shaping circuit 30, which is provided in the selecting unit 25 and takes care of an orderly transmission of the address signals, which are passed on from the preceding selecting unit 25, to the measuring units 5 of the associated group.

The second switch 28' also here serves in the closed state to connect the group voltage supply line 6' with the supply voltage output of a current-limiting and buffer circuit 32, the voltage input of which is connected with the system voltage supply line 6, which feeds the direct supply voltage $U_S$ to it. Standing at disposal at the output of the current-limiting and buffer circuit 32 is the buffered direct voltage $U_V$, which is fed on the one hand to the switch 28' and on the other hand to a direct voltage regulator 33, which produces from it the substantially lower direct voltage $U_{VV}$ for the supply of the control circuit 14' of the drive unit 25, as was described above in connection with FIG. 4 for the components of a measuring unit 5. The measuring units 5 of a group are also here with the aid of the switch 28' thus connected to the general voltage and current supply only when the associated selecting unit 25 is selected.

The measuring units 5 illustrated in FIG. 6 are built up similarly as the measuring unit of FIG. 4. They likewise possess a temperature-dependent current source as measuring sensor 10, which on the one hand stands constantly in connection with the system measurement line 7 and on the other hand can be applied by way of a switch 11 to the direct supply voltage $U_V$, which by a current-limiting and buffer circuit 32 present in each measuring unit is derived from the direct voltage $U_M$, which appears on the group voltage supply line 6' when the switch 28' is closed. The control of the switches 11 takes place also here through the signal which appears at the output A of the associated control circuit 14. The measuring unit address signals are fed to the inputs E of the control circuit 14 by way of the group command line 8' when the switch 28 of the selecting unit 25 is closed. In FIG. 6, the switch 11 of the second measuring place of the illustrated group is closed so that its measuring sensor 10 thus lies at the direct voltage $U_V$ and impresses into the continuous system measurement line a current which represents a measure of the environmental temperature of this measuring sensor 10 and is fed to the central control unit 2 as measurement signal for evaluation.

Each measuring unit 5 in FIG. 6 furthermore comprises a direct voltage regulator 33, which converts the direct voltage $U_V$ at the output of the current-limiting and buffer circuit 32 into a smaller direct voltage $U_{VV}$, which serves as supply voltage for the components of the respective measuring unit 5. The second switch 15 reproduced in FIG. 4 and both the diodes 12 and 13 have been omitted here for the sake of simplicity, can however be provided also here when semiconductor switches find employment as switches 11.

Figure 8:
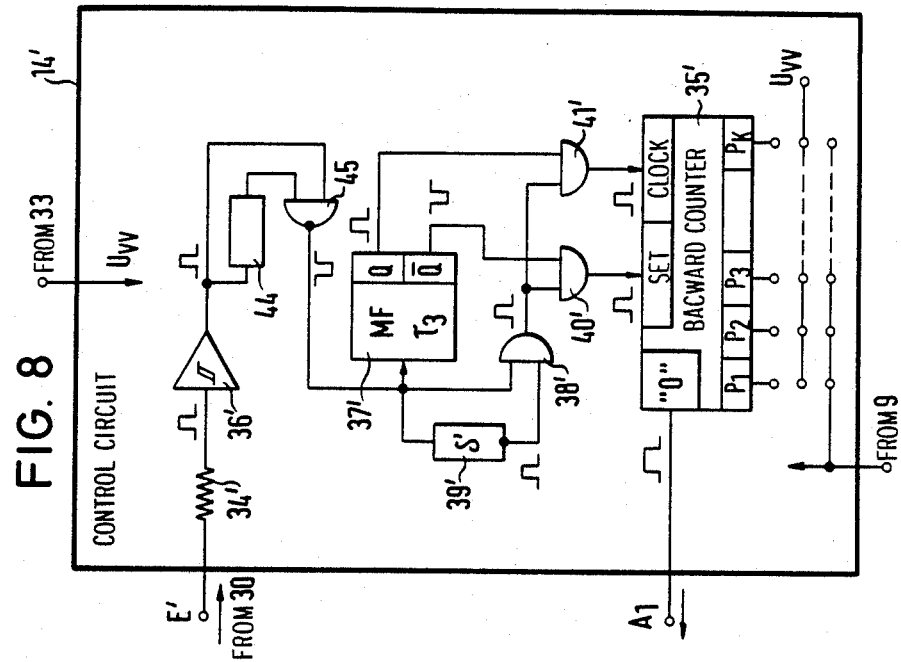
Figure 7:
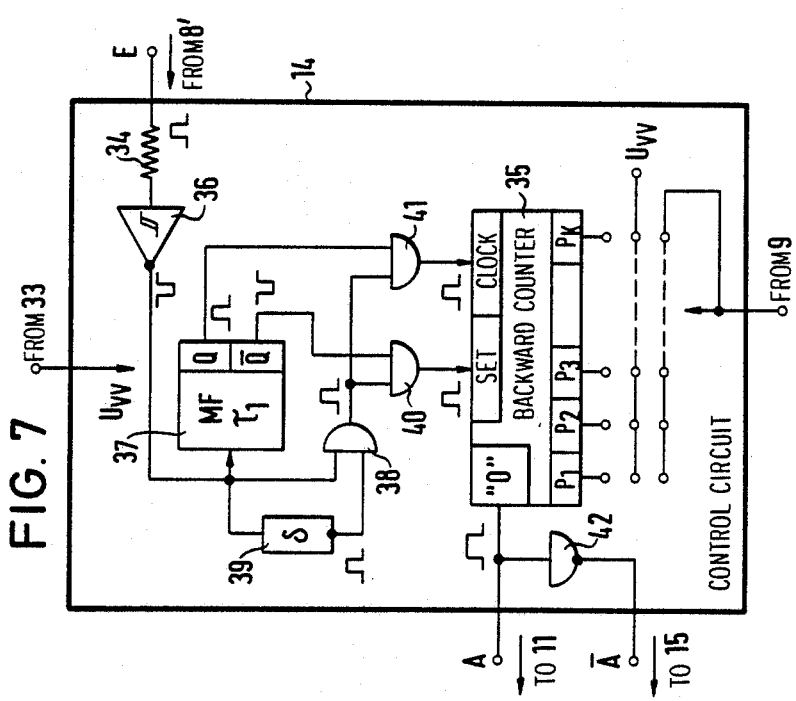

Described in the FIGS. 7 and 8 are preferred embodiments of control circuits 14 and 14', respectively, which can find employment in the measuring units 5 or the selecting units 25. It is in that case presumed that the address signals for the measuring units as well as also for the selecting units (in so far as present) are sequences of rectangular pulses which the central control unit 2 delivers on the system command line 8 and which are received by the control circuit 14 and 14', respectively, and decoded through counting-down.

As the FIGS. 7 and 8 show, each control circuit 14 and 14', respectively, comprises a programmable backward counter 35 and 35', which can be programmed to a certain initial count value n or m thereby, that its programming inputs $P_1$ to $P_k$ are connected either with the supply voltage $U_{VV}$ or with the ground line 9. This is represented only schematically in the FIGS. 7 and 8 without a concrete programming being illustrated.

In order that the programmable backward counter 35 or 35' is set to its respective initial count value n or m, a positive voltage pulse must be fed to its setting input. These pulses, designated in the following as setting pulses, are at the start of each measuring cycle likewise delivered by the central control unit 2 on the command line 8 and get directly to all measuring units 5 in the example of embodiment according to FIG. 1. In order that these setting pulses can be distinguished from the following count pulses forming the address signals, they are encoded by possessing a different pulse width than these. One infers this clearly from the uppermost lines E or E' of the FIGS. 9 and 10, where initially a respective setting pulse with the pulse width $t_1$ or $t_3$ and then a series of count pulses is illustrated, which all possess the pulse width $t_2$ or $t_4$. Since these differently wide pulses are all transmitted on one and the same command line 8 or 8', they must be distinguished one from the other by the control circuit 14 or 14'. For this purpose, the control circuits 14 and 14' possess pulse width discriminator circuits.

In the case of the measuring unit control circuit 14 illustrated in FIG. 7, the pulses get from the input E by way of a current-limiting resistor 34, which prevents the flowing of too great a current in the case of a short-circuit to ground in the control circuit 14, to an inverting Schmitt trigger stage 36, the output of which is connected with the clock input of monostable trigger stage 37, which is connected with one input of an AND-gate 38 and the input of an inverting delay member 39; the output of the delay member 39 is connected to the second input of the AND-gate 38. The monostable trigger stage 37 reacts to the falling edge of the pulses delivered by the Schmitt trigger stage 36 and at its outputs Q or $\overline{Q}$ delivers positive or negative pulses, respectively of the time length $\tau_1$. The delay member 39 delays the pulses appearing at its input independently of their length in time by a time interval $\delta$ and delivers them again in inverted form. This is illustrated in the third line VZ39 of FIG. 9. Since the AND-gate 38 receives on the one hand the undelayed pulses from the output of the Schmitt trigger stage 36 and on the other hand the delayed pulses from the output of the delay member 39, it produces each time an output pulse of the time length $\delta$, which follows directly the end of the pulse delivered by the Schmitt stage 36. This is to be inferred from the line G 38 of FIG. 9. Since delays introduced by the Schmitt trigger stage 36 play no part, they have been omitted in this illustration.

The output of the AND-gate 38 is connected with one input of each of two further AND-gates 40 and 41, of which the AND-gate 40, the second input of which is connected with the $\overline{Q}$ output of the monostable trigger stage 37, drives the setting input of the programmable backward counter 35, whilst the output pulses of the AND-gate 41, the second input of which is connected with the Q output of the monostable trigger stage 37, get to the clock input of the counter 35.

The width $\tau_1$ of the pulses delivered by the monostable trigger stage 37 is so chosen that it is smaller than the width $t_1$ of the setting pulses and greater than the sum of the width $t_2$ of the counting pulses and the delay time $\delta$ of the delay member 39. There thus applies:

$$t_2+\delta<\tau_1<t_1. \quad (1)$$

It is attained through this choice of the pulse widths that, as FIG. 9 shows in the line G 40, a pulse of the time length δ appears at the output of the gate 40 only in response to a setting pulse, whilst the gate 41, as indicated in line G 41, delivers output pulses of the width δ only in response to counting pulses.

The just described pulse width discriminator circuit can thus distinguish between two pulse widths, which is fully adequate for their employment in the control circuit 14 for the measuring units 5. For their employment in the control circuit 14' of the selecting units 25, a pulse width discriminator circuit must however distinguish not only the setting and counting pulses for the selecting units one from the other, but also distinguish both these still from the setting and counting pulses for the measuring units. For this purpose, the above described arrangement must, as illustrated in FIG. 8, be augmented by a further delay member 44 and a NAND-gate 45, the one input of which together with the delay member 44 is driven from a non-inverting Schmitt trigger stage 36 again connected by way of a current-limiting resistor 34' with the input E' and the other input of which is connected with the output of the non-inverting delay member 44. The NAND-gate 45 then drives the circuit elements 37', 38' and 39' in the same manner as occurs in the case of FIG. 7 through the output of the inverting Schmitt trigger stage 36 with the elements 37, 38 and 39. Since the remaining build-up of the control circuit 14' corresponds exactly to that of the control circuit 14, it is not described once again here.

In the arrangement according to FIG. 1, the backward counter 35 of the control circuit 14 is programmed to a different initial count value n in each measuring unit 5, wherein n in the regular case runs through all whole numbers from 1 up to a maximum value p, which represents the number of the measuring units present in the system.

Directly after the switching-on of the measuring system and at the start of each measuring cycle, the central control unit 2 delivers a setting pulse of the width $t_1$ by way of the command line 8, which pulse gets to all measuring units and sets all backward counters 35 to the respective initial count value n.

Thereafter, the central control unit 2 delivers the address signals likewise on the command line 8 in order to select the individual measuring units 5 and cause each of them to perform a measuring operation, in which initially the switch 11 is closed and then again opened.

These address signals are now not delivered in the form of pulse packets, the pulse number of which each time corresponds to the initial count value n of the programmable backward counter 35 of a quite certain measuring unit 5. Rather, as address signal for the first measuring unit to be selected, for the backward counter of which n=1, a single counting pulse is delivered, after the processing of which a positive voltage appears (see line $A_{n=1}$ of FIG. 9) at the "0" output of the backward counter concerned, whilst the backward counters of all remaining measuring units count down from n to n−1 without anything changing at their "0" outputs. The switch 11 is therefore closed for the time space, which elapses between this first and the next counting pulse, only for the measuring unit 5, for which n is equal to 1, and the measuring sensor 10 is applied to the voltage supply line 6 so that an impressed current corresponding to the environmental temperature of this measuring sensor flows through the measurement line 7 to the central control unit and can be evaluated there.

For the case that the measuring unit 5 is built up according to FIG. 4, i.e. possesses a second switch 15, which must be operated in anti-phase to the switch 11, an inverter 42, the output of which forms the output $\overline{A}$ of the control circuit 14, is connected, as FIG. 7 shows, to the "0" output of the backward counter 35.

When the measurement is terminated, an additional signal is added by the central control unit 2 to the address signal of the just activated measuring unit, which additional signal in the present case is simply a further counting pulse which gets by way of the command line 8 to all measuring units. It has the effect that the backward counter 35 of the measuring unit 5, the switch 11 of which was just still closed, counts towards "−1", whereby the positive voltage at the "0" output of this counter vanishes, whilst the measuring unit 5, the backward counter 35 of which is programmed to n=2, now counts to "0" so that a positive voltage appears at the associated "0" output and the concerned switch 11 closes (line $A_{n=2}$ of FIG. 9). All remaining backward counters also count to n−2 without the zero level at their output vanishing, since n≠2 is true for them.

For the termination of the measuring operation at the second selected measuring unit 5, the central control unit 2 generates a third counting pulse on the command line 8, which switches off the second measuring unit and selects a third measuring unit. Through the delivery of p counting pulses thus for running through a measuring cycle, all measuring units 5 are caused in sequence to perform a measuring operation. Following hereupon either immediately or after elapsing of an interval selectable in its length, a setting pulse is again transmitted by way of the command line 8 to all measuring units 5 and a new measuring cycle can be performed.

The reverse counting of the counter 35, which is programmed to the maximum initial count value p, to the count value 0 and the signals in that case appearing at its output and at the counter output of the preceding measuring unit 5 are likewise illustrated in FIG. 9.

What has just been said applies in like manner for the embodiments according to the FIGS. 3 and 6 with the following exceptions:

1. Since always only that group of measuring units is connected by their group command line 8' to the continuous system command line 8, the selecting unit 25 of which has previously been selected by the central control and measuring unit, only the initial count values n of the backward counters 35 must be different one from the other within each measuring unit group, can however repeat from group to group, i.e. each of the groups 16 to 22 possesses a measuring unit with the initial count value n=1, a measuring unit with the initial count value n=2 and so forth.

2. What was described above as measuring cycle for the entire system, concerns here always only the measuring units 5 of one single group 16 to 22 and this also only when the associated selecting unit 25 was selected previously. Each such group measuring cycle must thus first be preceded by an address signal for the activation of the selecting unit 25 concerned.

The start of a system measuring cycle, as it runs down in the examples of embodiment according to the FIGS. 3 and 6, is now described in the following with reference to FIG. 10, wherein the function of the control circuit 14' of FIG. 8 is also explained once again.

In FIG. 10, a different time scale than that in FIG. 9 has been chosen so that here the times there appear shortened to one half.

Before the first group can be selected through emission of its address signal in a system measuring cycle, the backward counters 35' in the control circuits 14' of the selecting units 25 must first be set to their programmed initial count values m. This occurs with the aid of the setting pulse of the width $t_3$, which is illustrated in the uppermost line E'=ST36' of FIG. 10 and conducted to the control circuit 14' by way of its input E' and passed on by the Schmitt trigger stage 36' although prepared, but not inverted and practically undelayed to the delay circuit 44. The latter possesses a delay time $\tau_2$, by which the pulses of the Schmitt trigger stage 36' are delayed according to line VZ44 of FIG. 10. This delay time $\tau_2$ is so chosen that it is longer than the pulse widths $t_1$ and $t_2$ of the setting and counting pulses for the measuring units and shorter than the pulse width $t_4$ of the counting pulses for the selecting units 25 and thereby also shorter than the pulse width $t_3$ of the setting pulses for the selecting units 25. Thus, the NAND-gate 45 suppresses the front part of each Schmitt trigger pulse for a time span $\tau_2$. This means that only such input pulses can appear in negative form at the output of the NAND-gate 45, which are longer than $\tau_2$. Since $\tau_2$ is so chosen that it is indeed smaller than $t_3$ and $t_4$, yet greater than $t_1$ and $t_2$, only the corresponding setting and counting pulses for the selecting unit 25, but not however the short setting and counting pulses for the measuring units 5 are let through by the NAND-gate 45, as one readily infers from the line G45 of FIG. 10. The output pulses of the NAND-gate 45 are then processed by the following pulse width discriminator circuit with the circuit elements 37' to 41' exactly as has already been described above with reference to the FIGS. 7 and 9. The single difference here consists in that the monostable trigger stage 37' delivers pulses of the time width $\tau_3$, which is so chosen that:

$$(t_4-\tau_2)+\delta'<\tau_3<(t_3-\tau_2). \qquad (2)$$

Thus, only such pulses of the width $\delta'$, which corresponds to the setting pulses for the selecting units 25, thus appear at the output of the AND-gate 40', whilst only such pulses of the time width $\delta'$, which corresponds to the counting pulses for the selecting units 25, appear at the output of the AND-gate 41'. As the line RZ35'$_{m=q}$ shows, all backward counters 35' of the selecting units 25 are set by the setting pulse, which is illustrated at the extreme left in FIG. 10, to their programmed count value m, from which they then count down with each counting pulse of the width $t_4$. This is illustrated in the line A'$_{m=1}$ for the selecting unit, which is first in the selection sequence and at the output A' of which a positive voltage appears on the first selecting unit counting pulse so that the switch 28 (FIG. 3) or the switches 28 and 28' (FIG. 6) are closed. Hereafter appear, as the uppermost line of FIG. 10 shows, a setting pulse and a series of counting pulses for the measuring units, which because of the function of the delay member 44 and of the NAND-gate 45 remain without effect for all selecting units, however first set the measuring units of the first group to the count values programmed in and then select them in sequence in the manner as illustrated in FIG. 9. When the last measuring unit has been selected by the pulse 47, the measuring operation there has been terminated and a setting pulse 48 been delivered for the measuring units, then a further counting pulse 49 for the selecting units appears on the system command line 8, by reason of which pulse the just still selected selecting unit opens its switch 28 or switches 28 and 28' so that the measuring units belonging to this group are switched off. A positive voltage appears for this purpose, as the lowermost line of FIG. 10 shows, at the output of the backward counter 35' of that selecting unit, which has been programmed to the initial count value m=2 and a group measuring cycle can run down only for this group. The just mentioned, concluding setting pulse 48 for the measuring units takes care that the measuring units of the group, that has just been run through, on the selection of the next group with certainty also deliver no measurement signal when on the deactivation of their selecting unit 25 by reason of a fault only still the switch 28, not however the switch 28' can be opened.

It is evident from the above description that also the address signals for the selecting units are so structured that the respectively following address signal results from the preceding address signal and an additional signal which in the present simplest case merely consists of a further counting pulse for the selecting units. Since all counting pulses are always conducted to all selecting units 25, all backward counters 35 thus count down by 1 for each counting pulse. Thus, in the "normal case", also the groups of the system are selected in a sequence preset by the programming of their backward counters. However, a freely selectable access is possible also here when as many counting pulses for the selecting units are delivered one directly after the other, i.e. without interposed setting and counting pulses for measuring units, as corresponds to the address of the selecting unit to be selected.

The control circuit 14', which is illustrated in FIG. 8 and possesses only a single output $A_1$, is suitable for an employment in selecting units 25, as illustrated in the FIG. 2 or 6 and in which only one switch 28 or several simultaneously actuable switches 28, 28', . . . are present.

When however as shown in FIG. 3, a further switch 29 (with which additional switches 29' . . . are in a given case actuable simultaneously) is to be closed independently of switch 28 on the reception of a modified address signal, then the control circuit 14' must have a circuit arrangement which can distinguish the "normal" address signal from the modified address signal and on reception of the modified address signal deliver a corresponding control signal by way of an output $A_2$. Such a circuit arrangement can for example be a second programmable backward counter, the setting and clock inputs of which are connected parallelly to the backward counter 35' to the outputs of the AND-gates 40' or 41' and the "0" output of which is connected with the $A_2$ output of the control circuit 14'. This further programmable backward counter is programmed to its own address, which is different from the address of all remaining programmable backward counters of the system; thereby, the possibility exists of so selecting each selecting unit 25 of the system shown in FIG. 3 in two different ways from the central control unit 2 that it closes either the switch 28 (and possibly present switches 28', . . . parallel thereto) or the switch 29 (and possibly present switches 29', . . . parallel hereto). Hereby, as already explained, the groups 16 to 22 can be selected in independent manner with the aid of at least two different selecting units 25, whereby the operational reliability of the system is increased substantially.

Figure 11:
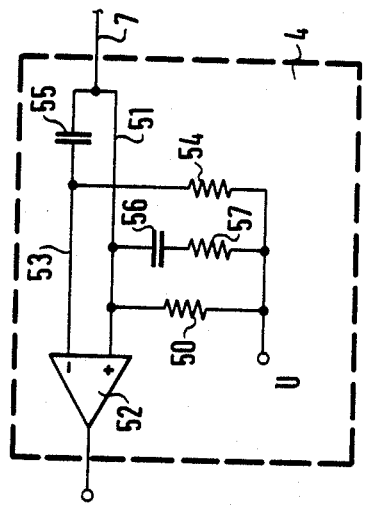

Illustrated in FIG. 11 is an input circuit 4, which is preferably employed in the central control unit 2 for the reception and for the amplification of the measurement signals arriving on the measurement line 7 when the measuring sensors 10 are formed by, for example, temperature-dependent current impression circuits as was explained in connection with the FIGS. 4 and 6.

In this case, the respective measurement signal is formed by the current, which the respectively activated measuring sensor 10 impresses on the measurement line 7. The magnitude of this current represents the magnitude of the environmental parameter, thus for example the environmental temperature, monitored by the measuring sensor 10 concerned. Therefore, the magnitude of this impressed current must be measured in the central control unit 2 and the measurment value thus obtained be evaluated further.

For this purpose, the input circuit 4 is provided with an ohmic measuring resistor 50, the one end of which is connected by way of a line 51 in directly conductive connection with the measurement line 7, whilst its other end is applied to a fixedly preset reference potential $U_{Ref}$, the preferred fixing of which is explained still more exactly further below. The impressed current coming from an activated measuring unit 5 thus flows by way of the measuring resistor 50 to the reference potential $U_{Ref}$ and in that case at the measuring resistor 50 produces a voltage drop, the magnitude of which represents a measure for the monitored environmental parameter of the activated measuring unit 5. The voltage dropping across the measuring resistor usually lies in the order of magnitude of 0.5 volts and must be amplified for further processing and recording.

This takes place with the aid of a measurement amplifier 52, which is constructed differential amplifier with high in-phase suppression. For this purpose, "instrumentation amplifiers" can for example be used, which have an in-phase suppression of more than 1:10$^4$ up to an upper frequency limit of 200 kiloHertz.

As FIG. 11 shows, the one, for example the "positive" input of the differential amplifier 52 is connected in direct conductive connection with that end of the measuring resistor 50, which is connected by way of the line 51 with the measurement line 7.

The other, for example the "negative" input of the differential amplifier 52 is conductively connected by way of a line 53 with the one end of an ohmic resistor 54, the other end of which lies at the reference potential $U_{Ref}$. Furthermore, the "negative" input of the differential amplifier 52 is connected by way of the line 53 with the one terminal of a capacitor 55, the other terminal of which is connected with the measurement line 7. Finally still connected between the reference voltage $U_{Ref}$ and the line 51, which connects the measurement line 7 with the "positive" input of the differential amplifier 52 is a series connection which consists of a capacitor 56 and an ohmic resistor 57 and which thus lies in parallel with the measuring resistor 50.

This arrangement serves for the solution of the following problem:

The measurement line 7, which connects all measuring units 5 one with the other and on which the current impressed by the respective single activated measuring unit 5 is conducted to the central control unit 2, is extraordinarily long in the case of large measuring systems. This has the consequence that alternating voltage interferences, which can originate from the system itself or also from outside, are coupled in on this measurement line 7. By reason of these interferences, voltages occur at the measuring resistor 50, which lie in the same order of magnitude as the voltage which drops across it by reason of the impressed current coming by way of the measurement line 7. The signal-noise ratio would thus without further measures be extraordinarily bad.

In order to improve this signal-noise ratio, both the inputs of the differential amplifier 52 are connected with the measurement line 7 as already described above, wherein the "positive" input is connected in directly conducting manner with the measurement line and the "negative" input is capacitively coupled with the measurement line 7. In other words, the measurement line 7 is split up into two branches 51 and 53 in the input circuit 4. It is in that case of substantial significance that each of both these branches is terminated towards the reference potential $U_{Ref}$ by a terminating resistance corresponding to the characteristic impedance of the measurement line 7. This occurs for each of both the branches with the aid of a series connection consisting of a capacitor and an ohmic resistor, wherein the series connection, associated with the branch 51, of the capacitor 56 and the resistor 57 lies in parallel with the measuring resistor 50, while the series connection, associated with the branch 53, is formed by the coupling capacitor 55 and the ohmic resistor 54.

The terminating impedances formed by both the series connections take care that alternating voltage interferences on the measurement line 7 get to both the inputs of the differential amplifier with equally great amplitude and do not have phase displacements each relative to the other, since each of both the branches 51 and 53 possesses a reflection-free termination adapted to the characteristic impedance of the measurement line 7. Because of its high in-phase suppression, the differential amplifier 52 can thus almost completely suppress all alternating voltage interferences arriving on the measuring line 7, whilst the direct voltage dropping across the measuring resistor 50 by reason of the impressed current is fed only to its "positive" input and therefore appears at the output of the differential amplifier 52 with the desired amplification.

The interference suppression attained hereby is so good that it is possible still to obtain unobjectionable measurement results even for very great and widely branched measuring systems. In that case, the measurement line 7 can as system measurement line connect all measuring units 5 one with the other and it is not required to provide additional group measurement lines which are connected through corresponding switches in the selecting units 25 with the measurement line 7 only when the selecting unit concerned is activated.

The reference voltage $U_{Ref}$, with which that end of the measuring resistor 50 is connected, which does not lie at the "positive" input of the differential amplifier 52, can in principle be the zero potential.

When however current sources, which are dependent on environmental parameters and which in the selected state are connected with their supply voltage with the aid of semiconductor switches 11, are employed as measuring sensors 10 in the measuring units 5, then each measuring unit 5 must expediently comprise a second switch 15, with the aid of which the connecting line leading from the switch 11 to the measuring sensor 10 can be connected with the ground line 9 when the switch 11 is opened. This was explained in detail above with reference to FIG. 4.

For very large measuring systems, however, the following problem arises in that case: the entire supply current, which is fed into the cable by way of the voltage supply lines 6 or 6', for the components and circuit units of the selecting units 25 and the measuring units 5 flows back again to the central control unit 2 by way of the ground line 9. Since the cross-section of the cable wire, which forms the ground line 9, can not for reasons of costs be chosen to be as large as desired, this has the consequence in the case of spatially very far extended measuring systems that at least at such measuring units 5, which lie far remote from the central control unit 2, a potential is present at the ground line 9, which lies by some few volts above the zero potential which is applied by the central control unit 2 to the ground line 9.

If one were now in such a system to choose the reference voltage $U_{Ref}$ to be equal to the zero potential, then this would mean that the measurement line 7 would at practically all measuring units 5 lie at a lower potential than the ground line 9, since the current impressed by the respectively activated measuring sensor 10 into the measurement line 7 is only very small and thus effects only a very small voltage drop over the length of this line 7. The potential appearing on the measurement line 7 in the measuring units 5 thus differs from the reference potential $U_{Ref}$ substantially only through the voltage drop across the measuring resistor 50. This measuring resistor can however not be made as large as desired, because the RC-member, which this measuring resistor 50 forms with the capacitive loading of the measurement line 7, would otherwise possess too great a time constant which would make possible only a very slow pulsing of the measuring units.

If one however chooses such a value for the measuring resistor that this time constant has an acceptable magnitude, then the voltage drop, which results on the flowing of the small impressed current by way of the length of the measurement line 7 and the measuring resistor 50, is smaller than the voltage drop which occurs over the length of the ground line 9 for measuring units 5 lying far remote from the central control unit 2.

If one were now to choose the reference voltage $U_{Ref}$ to be equal to the zero potential, then this would have the consequence that at least for measuring units 5, which lie far remote from the central control unit 2, a voltage, which is positive relative to the potential of the measurement line 7, of a few volts would be applied from the ground line 9 by way of the closed switch 15 and the diodes 13 to the terminal of the measuring sensor 10 connected with these diodes. This would have the consequence that a small parasitic current would flow constantly, i.e. even with the switch 11 opened and in spite of the diode 12, into the measurement line 7 through all measuring sensors 10, which are arranged in measuring units 5 lying far remote from the central control unit 2. The sum of these parasitic currents would in the case of large measuring systems so falsify the actual measurement current impressed by the measuring sensor 10 of the single activated measuring unit 5 that a usable measurement would no longer be possible.

For the solution of this problem, it is proposed according to the invention that the reference potential $U_{Ref}$ in the input circuit 4 is so chosen that the voltage between the reference potential $U_{Ref}$ and the zero potential is greater by a preset value, for example 0.5 volts, than the maximum permitted voltage drop on the ground line 9. When the entire system is so dimensioned for example that a voltage drop of at most 3 volts can occur on the ground line 9 between the measuring unit 5 lying most unfavourably and the central control unit, then the reference potential $U_{Ref}$ is put at 3.5 volts. It is thereby made certain that no positive voltage, which could lead to the impression of a current into the measurement line 7, drops across the measuring sensor 10 when the switch 11 is opened in the measuring unit 5 lying most unfavourably. With this arrangement, the potential on the measurement line 7 can lie some volts above the potential on the ground line 9 in the case of measuring units 5, which have only a small spacing from the central control unit 2, so that an opposite voltage drops across the measuring sensors 10 concerned. The diodes 12 and 13 connected in series with the measuring sensor 10 are however of such polarity that this voltage is present at them in blocking direction and thus no current can flow from the measurement line 7 to the ground line 9. If temperature-dependent current sources find employment as measuring sensors 10, then this blocking effect of the diodes 12 and 13 is still increased, since also these current sources possess diode characteristics and they are so connected in series with the diodes 12 and 13 that the blocking directions of these three components are equally directed.

Through the "putting-up", of the reference voltage $U_{Ref}$ relative to the zero potential, semiconductor switches or other switches, which in the opened state let through a leakage current, can be employed as switches 11 without the size of the measuring system being limited hereby.

The individual measuring units 5 are so driven that switching-over from a just activated measuring sensor to the next is done with a least possible time space. The time spacing between the opening of a closed switch 11 of a previously activated measuring unit and the closing of the switch 11 of the next measuring unit to be activated shall be kept as small as possible, preferably in the region of the response time of the measuring sensors, i.e. in the order of magnitude of 20 microseconds up to at most 50 microseconds. Short switch-over times of that kind offer the following advantage: As already mentioned, the RC-member formed by the capacitance loading of the measurement line 7 and the measuring resistor 50 possesses a certain time constant which can not be made as small as possible, since the capacitance loading depends on the length of the measurement line 7 at the measuring resistor 50 must have a certain minimum size in order that the measurement current impressed by a measuring sensor 10 leads to a voltage drop which is easily processable further and not too small. If one assumes that no current has flown on the measurement line for a longer time, then the capacitance loading of the measurement line 7 is completely discharged and the current impressed by the measuring sensor on the switching-on of a measuring sensor must initially charge up the capacitance loading before it stands at disposal in full magnitude at the measuring resistor 50 of the input circuit 4. The time, which is needed until this has reached a stable state making an exact measurement possible, depends on the time constant of the RC-member under discussion here. If one were now to make the switch-over time from an activated measuring sensor to the next so great that the capacitance loading of the measurement line can largely or completely discharge in this time span, then the next measuring sensor would also again have to remain activated until the capacitance loading has been charged up completely and a stable state been attained. The time constant of the RC-member would thus enter completely into the cycle frequency, by which switching-over from one measuring unit to the next can be done. Due to the fact that the switch-over time spaces are chosen to be as brief as possible, the capacitance loading of the measurement line 7 does not have sufficient time to discharge significantly after the switching-off of the previously activated measuring sensor 10 before the next measuring sensor is activated. The capacitance loading need therefore be recharged only slightly to the extent, to which the currents impressed by two successively activated measuring sensors differ each from the other. This recharging time is however substantially shorter than the time constant of the RC-member so that the transition from one stable state into the next takes place very rapidly. Thereby, the clock frequency, at which the measuring units are selected in sequence, can be chosen to be substantially higher than would be possible in the case of greater "pauses" between the individual current impression processes. In every case, it is however made certain that the measuring sensors are not switched on overlappingly so that the previously switched-on measuring sensor is switched off with certainty before the next measuring sensor is switched on.

A first embodiment of a current-limiting and buffer circuit 32 shall now be explained with reference to FIG. 12. This circuit possesses two equally built-up branches 60 and 70, which are arranged each in parallel to the other to increase the reliability. Each of both the branches 60 and 70 comprises a current-limiting diode 61 and 71, respectively, a current-limiting resistor 62 and 72, respectively, and a buffer capacitor 63 and 73, respectively, which are connected in series in this sequence between the voltage supply line 6 and 6', respectively, and the ground line 9. The supply voltage $U_V$ for the respective circuit arranged downstream can be taken off between the current-limiting resistor 62 and 72 and the buffer capacitor 63 and 73, respectively. In order to be able to take off a common voltage $U_V$ from both the parallel branches 60 and 70, both the tap points for the supply voltage are decoupled by two diodes 64 and 74, which are connected in opposition and each with the other by their cathode terminals. The supply voltage $U_V$ is then fed to the circuit units arranged therebehind from the junction of both these decoupling diodes 64 and 74.

This current-limiting and buffer circuit 32 is preferably used when very large measuring systems must be built up. In order to keep the current requirement and thereby also the cross-section of the current supply line and the ground line as small as possible in these measuring systems, their circuits are built up expediently from C-MOS components which have an extra-ordinarily low current consumption in the rest state, but for a brief time draw a substantially higher current by comparison therewith during the switching-over from one logic level into the other.

Since in the case of a large measuring system, which can comprise 50000 and more measuring units with the associated selecting units, components will fail with certainty after a certain time in continuous operation, care must be taken above all in the case of cables, which are laid at inaccessible places, for example in the ground, that such defects render functionally incapable only the immediately concerned circuit, not however the entire measuring system.

Most dangerous in this respect is the alloying-through of components, which reduces the normally high input resistance of an input practically to zero so that a very high current can flow into this input.

In the current-limiting circuit 32, this is prevented at least for the current supply inputs, at which the supply voltage $U_V$ is present, primarily through the current-limiting diodes 61 and 71, which on employment in a measuring unit 5 limit the current flowing through them to a value, for example 400 micro-amps, which is somewhat greater than the current which the measuring unit 5 needs for the generation of the maximum possible measurement current. In principle, one such current-limiting diode would suffice in each of both the branches 60 and 70; nevertheless, in order to increase the reliability, a second, equally acting component is according to the invention connected in series with this diode. Since the costs for such current-limiting diodes are comparatively great, a current-limiting resistor 62 and 72, the limiting current of which in dependence on the supply voltage $U_M$ can however be substantially greater than the limiting current of the diodes 61 and 71, is preferably chosen as second component.

Particularly in the case of large measuring systems, the current-limiting resistors 62 and 72 must be dimensioned to be so great that the current, which altogether is drawn by way of the voltage supply lines 6 and 6', does not become too great even when it comes to an alloying-through at several measuring units and/or selecting units, in the current supply of each of which lies a circuit 32. A preferred value for the current-limiting resistors 62 and 72 is for example 10 kilo-ohms. In the case of the employment of C-MOS components, this would however without further measures mean that the supply voltage would collapse on each switching process because of the above mentioned switching current peaks characteristic of these components. In order to prevent this, the buffer capacitors 63 and 73 are provided, which deliver the required current for the brief switching times and then again charge up by way of the resistor 62 and 72, respectively. In that case, the current-limiting diode 61 and 71 has the effect that not the entire voltage drops across the resistor 62 and 72 and thus a substantially lower current flows. Therefore, the recharging of the buffer capacitors 63 and 73 takes place over a time space which is substantially longer than the time space needed for the switching operation. The current requirement, which in the case of C-MOS components is very high for the brief switching times and extra-ordinarily low for the rest times lying therebetween, is thus converted by this circuit into an about uniform, mean current requirement. The cross-section of the current supply line 6 and 6' can then in advantageous manner be oriented to this mean current requirement and no adaptation to the high switching current peaks is required.

The twofold employment of the just described current-limiting and buffer circuit in the selecting units 25, as illustrated in FIG. 6, is of particular importance in this respect. Here, the voltage supply line 6' of the entire measuring unit group is severed in the rest state by way of the switch 28' from the connection with the continuous system voltage supply line. If a selecting unit 25 is activated in such a system so that the control circuit 14' closes the switches 28 and 28', all measuring units 5 of this group are applied simultaneously to the current supply and in that case draw a correspondingly high switch-on current. Since a group can comprise 1000 or more measuring units, this would mean a a very strong peak loading of the continuous voltage supply line 6. In order to avoid this, the switch 28' in the closed state therefore connects the group voltage supply line 6' with the output of the current-limiting and buffer circuit 32, which for the remainder also delivers its buffered supply voltage $U_V$ to the control circuit 14'. The buffer capacitor 63 and 73 of this current-limiting buffer circuit 32 must be dimensioned to be sufficiently large in order to be able to deliver the switch-on current peak which occurs on the closing of the switch 28' and is substantially greater than the current peaks which occur during operation of the control circuit 14'. In the current-limiting and buffer circuits 32, which find employment in the measuring units 5, the capacitors can be adapted to the substantially lower peak current requirement at these places and be dimensioned to be correspondingly smaller.

Figure 13:
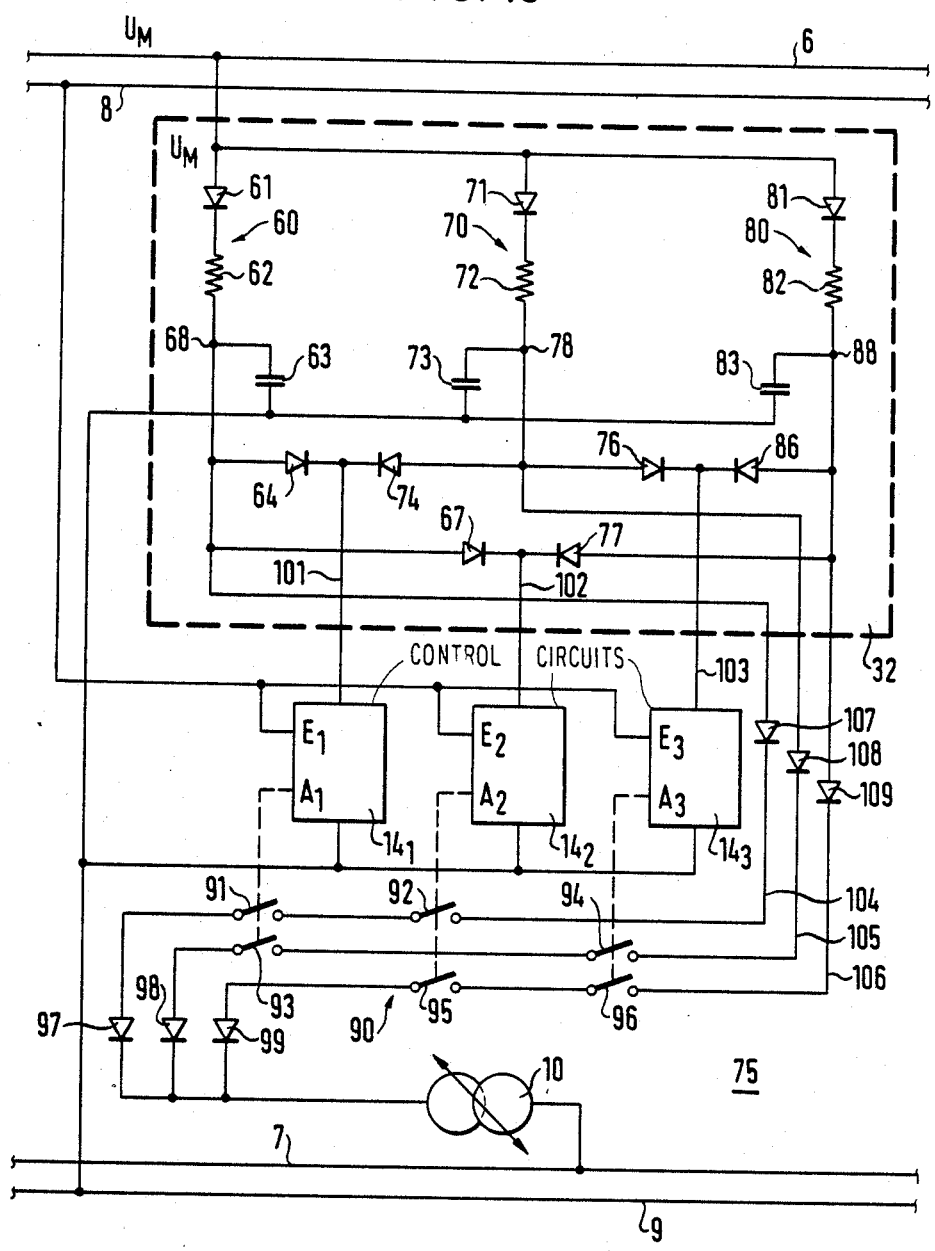

In FIG. 13, a measuring unit 75 is illustrated in an embodiment which according to the invention finds employment whenever particularly high demands are made on the reliability of the measuring system.

The measuring unit 75 in FIG. 13, like the measuring unit 5 in FIG. 4, comprises a measuring sensor 10, which is constructed as temperature-dependent current source; a switch arrangement 90 consisting of six switches 91 to 96 here takes the place of the switch 11 of FIG. 4. Of these six switches 91 to 96, two switches each time, namely the switches 91 and 92, the switches 93 and 94 and the switches 95 and 96 each time lie in series one with the other. These three series circuits each time consisting of two switches are connected on the one hand by way of three decoupling diodes 97, 98 and 99 with the voltage supply terminal of the measuring sensor 10 and on the other hand each time with one of three outputs of a current-limiting and buffer circuit 32 which one independently of the other supply the voltage required for the operation of the measuring sensor 10. Thus, the operating voltage can be applied to the measuring sensor 10 even still when two of the three thus formed voltage supply paths 104, 105 and 106 fail. On the other hand, the connecting one behind the other of two switches 91 and 92 or 93 and 94 or 95 and 96 each time in each of these voltage supply paths 104, 105 and 106 makes certain that the measuring sensor 10 can in the required manner after the performance of a measurement again be separated from the supply voltage even still when one of both the switches in each of the supply paths should fail in such a manner that it can no longer be opened.

Since the switches 91 to 96 are always opened and closed at the same time, they can in principle be driven from one and the same control circuit 14. In the example of embodiment shown in FIG. 13, three control circuits $14_1$, $14_2$ and $14_3$, the inputs $E_1$, $E_2$ and $E_3$ of which are connected in parallel to the command line 8 and the address reception circuits of which are programmed to the same address, are however provided to increase the reliability. The output $A_1$ of the first control circuit $14_1$ controls one of both the switches, namely the switch 91 in the first voltage supply path 104 and one of both the switches, namely the switch 93 in the second voltage supply path 105. The output $A_2$ of the second control circuit $14_2$ controls the second switch 92 in the first voltage supply path 104 and one of both the switches, namely the switch 95 in the third voltage supply path 106. The output $A_3$ of the third control circuit $14_3$ controls the second switch 94 in the second voltage supply path 105 and the second switch 96 in the third voltage supply path 106 of the measuring sensor 10.

The voltage supply inputs of the control circuits $14_1$, $14_2$ and $14_3$ are connected by way of three separate lines 101, 102 and 103 to three further voltage supply outputs of the current-limiting and buffer circuit 32. If desired, a direct voltage regulator 33 can still be connected into each of the lines 101, 102 and 103, as indicated for example in FIG. 4. For the case that the switches 91 to 96 are realised with the aid of semiconductor switches, each of the control units $14_1$, $14_2$ and $14_3$ can have a second output $\overline{A}$, with the aid of which a switch corresponding to the switch 15 of FIG. 4 is controlled in opposite phase to the switches 91 to 96. In that case, each of the three voltage supply paths 104, 105 and 106 must be connectible by way of a corresponding switch with the ground line 9. These switches were however omitted in FIG. 13 for the sake of greater clarity. The function of the diodes 13 of FIG. 4 is in the example of embodiment according to FIG. 13 taken over by the diodes 97, 98 and 99, of which each can if desired also be replaced by two diodes connected each behind the other.

Figure 12:
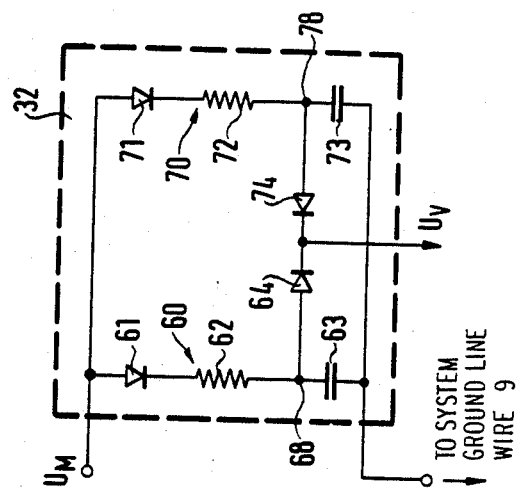

The current-limiting and buffer circuit 32 illustrated in FIG. 13 is built up similarly to the example of embodiment illustrated in FIG. 12. By contrast to this example of embodiment, it possesses however not two, but three branches 60, 70 and 80, which are arranged one in parallel to the other and each of which comprises a current-limiting diode 61 or 71 or 81, a current-limiting resistor 62 or 72 or 82 and a buffer capacitor 63 or 73 or 83, which are connected in series in this sequence between the voltage supply line 6 and the ground line 9. Taking place at the junctions 68 or 78 or 88 between the respective current-limiting resistor 62 or 72 or 82 and the associated buffer capacitor 63 or 73 or 83 is the tapping-off of three measuring sensor supply voltages which are equally great, but derived one independently of the other by way of the three branches 60 or 70 or 80 of the current-limiting and buffer circuit 32 from the measuring unit supply voltage $U_M$ supplied by way of the voltage supply line 6 and, as described above, can be applied to the measuring sensor 10 by way of the three separate supply voltge paths 104, 105 and 106 with the aid of the switch arrangement 90. Connected between the junctions 68 and 78 of both the branches 60 and 70 are—as for the example of embodiment in FIG. 12—two oppositely directed diodes 64 and 74, which are connected each with the other by their cathode terminals and between which the supply voltage for the control circuit $14_1$ is taken off. In corresponding manner, two decoupling diodes 76 and 86, between which the supply voltage for the control circuit $14_3$ is taken off, are connected between the junctions 78 and 88 of both the branches 70 and 80. Beyond that, two decoupling diodes 67 and 77, between which the supply voltage for the control circuit $14_2$ is taken off, are connected in like manner between both the junctions 68 and 88 of both the branches 60 and 80.

Through this manner of the intermeshing of the three branches 60, 70 and 80 of the current-limiting and buffer circuit 32, an extra-ordinarily high reliability is attained, since even when two of the three branches 60, 70 and 80 fail and no longer deliver voltage, for example because of a short-circuit in the buffer capacitor 63, 73 and 83 at the junction 68 or 78 or 88, one of the three control circuits $14_1$, $14_2$ or $14_3$ and one of the three voltage supply paths 104, 105 and 106 always still receives the necessary operating voltage and the measuring unit 75 thus remains functionally capable.

In that case, the following is still of importance. As is evident from the FIG. 13, both the switches 91 and 92, which are actuated by both the control circuits $14_1$ and $14_2$, lie in series each with the other for example in the voltage supply path 104 of the measuring sensor 10. Both these control circuits are connected by way of the decoupling diodes 64 and 67 with the junction 68 of the branch 60 of the current-limiting and buffer circuit 32 and also the voltage supply path 104 is connected to this junction 68. The corresponding applies also to the voltage supply path 105, which is connected with the junction 78 of the branch 70, to which both the control circuits $14_1$ and $14_3$ are connected by way of the diodes 74 and 76, which circuits actuate both the switches 93 and 94, which lie in just this voltage supply path 105. The voltage supply path 106 is connected in like manner to the junction 88 of the branch 80, by which both the control circuits $14_2$ and $14_3$ are supplied with operating voltage by way of the diodes 77 and 86, which circuits actuate both the switches 95 and 96 lying in the voltage supply path 106.

Through this manner of the connections, it is attained that on the failure of two branches in the current-limiting and buffer circuit 32, exactly that voltage supply path 104 or 105 or 106 is connected with the branching point 68 or 78 or 88, which is still capable of function and delivers supply voltage also to both the control units which actuate the switches in the current supply path concerned. If one for example assumes tha both the branches 60 and 70 fail by reason of a short-circuit in both the buffer capacitors 63 and 73, then no supply voltage can any longer be taken off at the junctions 68 and 78 so that on the one hand both the voltage supply paths 104 and 105 and on the other hand the control circuit $14_1$ fail. Supply voltage then still stands at disposal only at the junction 88, from which it gets on the one hand into the voltage supply path 106 and on the other hand by way of the diodes 77 and 86 to the control circuits $14_2$ and $14_3$. However, just these two control circuits actuate the switches 95 and 96 in the voltage supply path 106 that has remained functionally capable so that the measuring sensor 10 can be switched on and off unobjectionably in spite of the failure of two branches 60 and 70. The corresponding applies also to the simultaneous failure of the branches 70 and 80 or 60 and 80.

As already mentioned, the switches 91 to 96 are preferably realised with the aid of semiconductor switches, to which an operating or supply voltage must be fed. The lines required for this are not illustrated in FIG. 13 for the sake of greater clarity. It is however expressly pointed out that chosen as supply voltage for these switches 91 to 96 is each time that supply voltage which is also fed to the control circuit $14_1$ or $14_2$ or $14_3$, by which the switches are respectively actuated. The switches 91 and 93 thus lie at the same supply voltage as the control circuit $14_1$, the switches 92 and 95 at the same supply voltage as the control circuit $14_2$ and the switches 94 and 96 at the same supply voltage as the control circuit $14_3$. Thereagainst, the operating voltage, which is to be switched by these switches, for the measuring sensor 10 is taken off not between the decoupling diodes 64 and 74 or 76 and 86 or 67 and 77, but from the junctions 68 or 78 or 88 of the current-limiting and buffer circuit 32. This has the consequence that even when two of the three branches 60, 70 and 80 fail, the supply voltage for the switches 91 to 96 always remains higher than the operating voltage to be switched for the measuring sensor 10; this is necessary because it comes to a damaging or destruction of semiconductor switches when the voltage to be switched becomes higher than the supply voltage.

In order to prevent with certainty that in normal, fault-free operation, the voltage, which is taken off at the junctions 68, 78 and 88 and must be switched by the switches 91 to 96, becomes greater by reason of the voltage drop across the decoupling diodes 64, 74, 67, 77, 76 and 86 than the supply voltages, which are taken off by way of the lines 101, 102 and 103, of these switches, a diode 107, 108 or 109 can still be connected into each of the voltage supply paths 104, 105 and 106.

In corresponding manner, also the current-limiting and buffer circuit 32, which finds employment in the selecting units 25, can be constructed with three branches which are intermeshed one with the other in the above described manner. In this case, also the selecting units then possess three control circuits $14_1'$, $14_2'$ and $14_3'$, which are parallel one to the other and then actuate a switch arrangement which consists of several switches and in this case replaces the switch or switches 28, 28′, . . . or 29, 29′, . . . . This form, designed for a particularly high reliability, of the selecting units 25 is preferably also used in such measuring systems, in which the measuring units 5 are built up not according to the above FIG. 13, but for example according to the FIGS. 4 and 5. Since the failure of a selecting unit always makes an entire measuring unit group unusable, particularly high demands are to be made on the reliability of the selecting units also where only moderate or small demands are made on the reliability of the measuring units.

It is clear that it is not possible in the case of large measuring systems, which have a cable length of 50 kilometers or more, to feed the pulses, which form the address signals of the measuring units and the selecting units, as well as the pulses which are needed for the setting of the programmable reverse counters in these units out from the central control unit 2 into a simple cable wire running through the entire system without interruption, without repeated regeneration and shaping of the pules.

As already mentioned, it is therefore provided to insert a first signal-shaping circuit 30 into the continuous system command line 8 in each selecting unit 25, which circuit prepares all pulses arriving by way of the preceding selecting unit 25 from the central control unit 2 on the system command line 8 before they are fed into the following line portion. Likewise, a second signal-shaping circuit 30 is preferably provided in each selecting unit 25, which circuit prepares the arriving pulses before they are fed by way of the closed switch 28 to the measuring units 5 of the associated group (see FIG. 6). Both of these signal-shaping circuits 30 can in principle be built up similarly and are more closely explained in the following with reference to FIG. 14.

Figure 14:
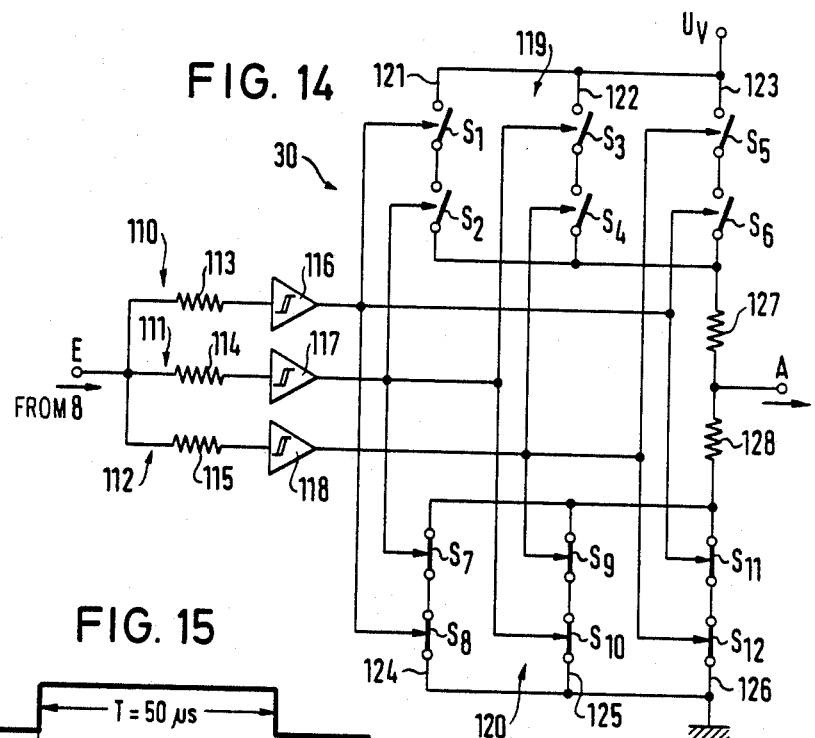

All circuits and components needed for the signal-shaping circuit 30 are present several times partially in parallel and partially in series arrangement in order to increase the reliability and operational security of the circuit. Thus, the pulse-shaped signals arriving on the command line 8 at the input E are initially processed further in three mutually parallel signal paths 110, 111 and 112, each of which comprises a current-limiting resistor 113, 114 and 115 and a Schmitt trigger stage 116, 117 and 118 lying in series with this resistor. In that case, the resistors 113, 114 and 115 again serve for limitation of the current which flows into the input E of the signal-shaping circuit 30 in case it has in this circuit come to a short-circuit to ground through the alloying-through of a component. The Schmitt trigger stages 116, 117 and 118 serve so to regenerate the edges of the pulses arriving at the input E that an unobjectionable driving of both the following switch groups 119 and 120 become possible. Each of both the switch groups 119 and 120 comprises three mutually parallel branches 121, 122 and 123 or 124, 125 and 126, which each consist of two switches $S_1$ to $S_{12}$ connected in series each with the other. Thus, the one switch group 119 comprises six switches $S_1$ to $S_6$ and the other switch group 120 comprises six switches $S_7$ to $S_{12}$. The driving of the switches $S_1$ to $S_{12}$ through the Schmitt trigger stages 116, 117 and 118 takes place so that the switches within one group 119 or 120 are operated simultaneously, the switches of the one group however always in anti-phase to those of the other group. Thus illustrated in FIG. 14 is the switching state, in which the switches $S_1$ to $S_6$ of the group 119 are open and the switches $S_7$ to $S_{12}$ of the group 120 are closed on the presence of an "0" signal at the input E. It is in that case presumed that different switch types, which can be brought into respectively opposite switching states by the same driving signal level, are employed for both the groups. This can for example be attained thereby, that one uses p-channel field effect transistors as switches $S_1$ to $S_6$ and n-channel field effect transistors as switches $S_7$ to $S_{12}$. Each of the three Schmitt trigger stages 116, 117 and 118 drives two switches lying in different branches of the one switch group and two switches lying in corresponding branches of the other switch group. Thus, the control inputs of the switches $S_1$ and $S_6$ *as well as of the switches* $S_8$ and $S_{11}$ are connected with the signal output of the Schmitt trigger stage 116, while the Schmitt trigger stage 117 drives the switches $S_2$ and $S_3$ as well as $S_7$ and $S_{10}$ and the Schmitt trigger stage 118 drives the switches $S_4$ and $S_5$ as well as $S_9$ and $S_{12}$.

It is attained through this arrangement that two of the three Schmitt trigger stages 116, 117 and 118 must fail at the same time in order that the signal-shaping circuit 30 no longer operates. Also, two switches lying in series with one another in one branch must simultaneously have a short-circuit so that they can no longer be opened or a switch in each of the three parallel branches of one group at the same time must be so defective that it can no longer be closed in order that the signal-shaping circuit 30 becomes unusable. The one of both the switch groups, namely the group 119, is connected between the output point A of the signal-shaping circuit 30 and the supply voltage $U_V$, whilst the other group 120 is connected between the output point A and ground. Since on the employment of field effect transistors as switches $S_1$ to $S_{12}$, which are driven by a common signal, during switching-over each time a short time span occurs, in which all switches $S_1$ to $S_{12}$ are closed, a current-limiting resistor 127 is provided between the output point A and the group 119 and a current-limiting resistor 128 between the output point A and the group 120. Both these resistors 127 and 128 play a great role in the matching to the characteristic impedance of the following line portion, as will be explained still more exactly below.

Through the alternating closing and opening of the switches 119 and 120, the output point A can thus be applied either by way of the resistor 128 to ground or by way of the resistor 127 to $U_V$, whereby the pulse arriving at the input E are reproduced and fed into the next line portion.

Should the pulses arriving at the input E be transmitted further with a preset delay, then an integrating member, which consists of a resistor lying in series in the signal path and a capacitor leading to ground and the flat output signal edges of which are each time converted by a further Schmitt trigger stage again into steep, bounce-free pulse edges, can be connected behind the Schmitt trigger stage 116 or 117 or 118 in each of the signal paths 110, 111 and 112. The output pulses delivered by these second Schmitt trigger stages are delayed relative to the associated input pulse by the time constant, chosen to be equally great for the three signal paths, of the RC-members and are employed in like manner for the driving of the switch groups 119 and 120 as is illustrated in FIG. 14 for the output signals of the Schmitt trigger stages 116, 117 and 118.

In a given case the time constant of the RC-members is dimensioned to be so large that after reception of a pulse at the input E, a corresponding pulse at the output A is delivered again only when the selecting unit 25, in which the concerned pulse-shaping circuit 30 is arranged, has processed this pulse, i.e. when the corresponding switching operations have taken place and the buffer capacitors 63, 73 and 83, discharged by these switching operations, of the current-limiting and buffer circuits 32 belonging to this group and the associated line portion are again charged up at least so far that no noteworthy charging currents flow any longer. Then, the pulse concerned can be passed onto the next selecting unit 25 without the danger of an overloading of the voltage supply line 6.

Quite particular significance is attached to both the resistors 127 and 128. It is namely usual to feed a pulse directly into a long line and to terminate this line for the avoidance of reflections at its end lying opposite the input end with an ohmic resistor to ground, the size of which is equal to the characteristic impedance of the line.

In a measuring system of the present kind, the cable wire, which forms the command line 8, for example possesses a characteristic impedance of 60 ohms or 75 ohms and the pulse crest voltage amounts to for example 15 volts. In the case of a feeding-in, corresponding to the state of the art, of such a pule into the system command line 8 or the group command line 8', a current of 250 milli-amps or 200 milli-amps would flow into the next command line portion on the opening of the switch group 120 and on the simultaneous closing of the switch group 119. Since this line portion can have a length of 1 kilometer or more, too great a voltage drop would occur over the line length through such a high current. A reflection-free line termination with a terminating resistor corresponding to the characteristic impedance is therefore not possible. If one on the other hand does not terminate the line at all, then by reason of multiple reflections, a wave, which runs to and fro several times and the amplitude of which though damped, but yet nevertheless leads to completely undefined signal conditions, forms itself for each pulse.

To overcome this problem, the rising edges of the pulses are fed into the respective next command line portion by way of the series ohmic resistor 127 and the falling edges of the pulses by way of the series ohmic resistor 128, the size of each of which is equal to the characteristic impedance of the line.

Thereby results a wave running to and fro exactly once, as explained in the following by reference to FIG. 15.

Figure 15:
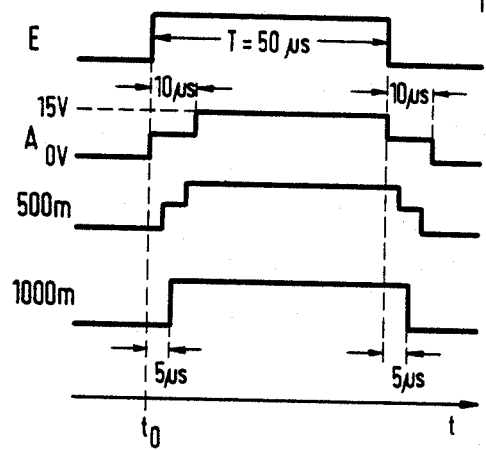

Illustrated in the uppermost line of FIG. 15 is the course of the control voltage which results for example at the output of the Schmitt trigger stage 116 (and in like manner at the outputs of the Schmitt trigger stages 117 and 118) of the signal-shaping circuit 30 of FIG. 14, whereby the switch group 120 is opened and simultaneously the switch group 119 closed at the instant $t_0$. The control voltage at this instant $t_0$ jumps from the previously present zero level to a logic "1". The pulse illustrated in the uppermost line of FIG. 15 possesses a time length T=50 microseconds, i.e. the switch group 119 is again opened and simultaneously the switch group 120 closed after a time of 50 microseconds, since the control voltage again drops with a very steep edge from logic "1" to logic "0".

Reproduced in the second line from the top in FIG. 15 is the voltage course which appears at the point A, i.e. at the output of the pulse-shaping circuit 30 behind the ohmic series resistors 127 and 128, in response to the voltage course reproduced in the line lying thereabove, wherein those effects are omitted, which arise due to the fact that the switches of both groups 119 and 120 can in a given case be closed for a very short time. One sees that the voltage at the point A rises in steplike manner at the instant $t_0$ to about half the supply voltage $U_M$ of for example 15 volts, i.e. to about 7.5 volts in the present case, since the series resistor 127 with the characteristic impedance of the following line portion forms a voltage divider in the ratio of 1:1.

The voltage at the point A remains at this value $U_M/2$ until the wave, which has been initiated in the command line portion through the feeding-in of the illustrated pulse, is reflected at the opposite end of the line portion and again run back to the input end. In the illustration in FIG. 15, it is assumed that the considered line portion possesss a length of 1 kilometer. In this case, the wave needs about 10 microseconds for a forward and return run so that the voltage at the point A rises to the full value of 15 volts after this time.

A corresponding process takes place at the point A for the falling edge of the pulse considered. At the instant, in which the control voltage drops from logic "1" to logic "0", it drops at point A from 15 volts again to only half the value of $U_M$, i.e. to 7.5 volts, and remains at this mean level again for about 10 microseconds, i.e. until the wave component reflected at the opposite end of the line portion has again arrived at the input end. Then, the voltage also at point A again drops to the ground potential of 0 volts.

The just described voltage shoulder, which occurs at the point A in response to the rising as well as also in response to the falling edge of a fed-in pulse, is to be found also at all other places of the line portions with the exception of the end lying opposite the input end, however possesses a different time length each time. This is illustrated in the third line from above of the FIG. 15 for the middle of the line portion considered which is spaced 500 meters from the input end. At this place, no reaction yet takes place at the instant $t_0$, because the wave initiated at the input point A needs about 2.5 microseconds in order to overcome the distance of 500 meters. After this 2.5 microseconds, the voltage in the middle of the line portion then also rises from the previously prevailing ground potential to about half the supply voltage $U_M$. The voltage shoulder that has arisen hereby is however only 5 microseconds long, because the wave need only traverse a distance of 1000 meters in order to get from the middle of the cable portion to the end lying opposite the input end and from there back again to the middle of the cable portion. This means that the voltage in the middle of the cable portion rises to the full value already 7.5 microseconds after the instant $t_0$. The corresponding applies to the falling edge of the pulse considered, where a voltage step likewise arises, which possesses a time length of only 5 microseconds.

Illustrated in the lowermost line of FIG. 15 is the voltage course at that end of the cable portion, which lies opposite the input end and possesses a spacing of about 1000 meters from the input end. One sees that the voltage here rises in a single step from 0 volts to 15 volts after the transit time of 5 microseconds and likewise again drop after 50 microseconds. At this end, one thus obtains a pulse which is largely equal to the pulse of the control voltage and displaced relative to this by 5 microseconds. If a portion of the system command line 8 is concerned in the case of the command line portion considered, then this pulse, illustrated in the lowermost line of FIG. 15, serves as input pulse for the pulse-shaping circuits 30 of the selecting unit 25 arranged at this place and it can be processed readily by these circuits because of its clean steep edges.

However, also the voltage steps, which are present between both the line portion ends, in the pulse edges present no particular problems. If a group command line 8' is concerned in the case of the line portion considered, then this does indeed have branching point, which are uniformly distributed over its entire length and by which each time the inputs of the control circuits 14 of the measuring units 5 belonging to this group are connected to this command line. Thus, no exact rectangular pulses are received at these inputs, but pulses, the rising and falling edges of which provide the above described voltage shoulders which according to distance of the concerned measuring unit from the associated selecting unit can possess a different time length. As was however explained above with reference particularly to FIG. 7, each control circuit 14 at its input standing in connection with the command line 8' possesses a Schmitt trigger state 36, the hysteresis of which can be so chosen that for each input pulse, it generates an output pulse which no longer possesses stepped edges and the time length of which is equal to the length of the pulse which was produced as control voltage in the preceding pulse-shaping circuit. For example, the voltage threshold, at which the Schmitt trigger stage 36 reacts to the rising edge of the input pulse, is for this purpose so chosen that it is higher than 50% of the input pulse crest voltage, whilst the threshold, on the falling below which the Schmitt trigger stage 36 reacts to the falling edge of the input pulse, is so chosen that it lies below 50% of the crest voltage of the input pulse. As one readily infers from the FIG. 15, it is thereby always attained that the output pulse of the Schmitt trigger stage 36 possesses exactly the same length as the pulse serving as control voltage.

Figure 16:
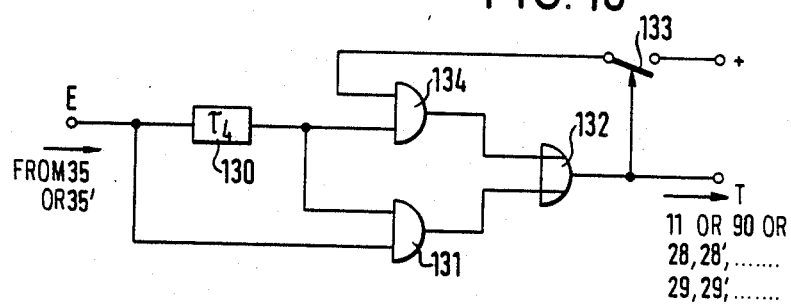

To be described in the following with reference to FIG. 16 is a delay circuit which can be inserted between the "0" output of each programmable backward counter 35 or 35' and the downstream switch 11 or the downstream switches of the switch group 90 or the downstream switches 28, 28', ... and 29, 29', .... This delay circuit comprises a delay member 130, to which are fed the pulse-shaped output signals of the associated backward counter 35 or 35', which it delays by a preset time span $\tau_4$. These delayed pulses are fed to an AND-gate 131, the other input of which receives the undelayed output signals of the associated backward counter 35 or 35'. Thereby, the AND-gate 131 shortens the output signals of the backward counter 35 or 35' by the time $\tau_4$, i.e. these output signals are completely suppressed by the AND-gate 131 when they are shorter than $\tau_4$. A pulse passed on by the AND-gate 131 gets by way of an OR-gate 132 on the one hand to the switch or switches 11 or 90 or 28, 28', ... 29, 29', ... and on the other hand to a switch 133, which belongs to the delay circuit and which is hereby closed and applies a logic "1" to the one input of an AND-gate 134, at the other input of which is the output signal of the delay member 130. Subject to the condition that the output pulse of the backward counter 35 or 35' was longer than $\tau_4$, the AND-gate 134 thus at its output delivers this pulse in full length, but delayed by the time $\tau_4$. Since the output of the AND-gate 134 is connected with the second input of the OR-gate 132, the OR-gate 132 keeps the switches 11 or 90 or 28, 28', ... or 29, 29', ... as well as also the switch 133 closed until the output signal of the delay member 130 has again dropped to logic "0".

If one chooses the repetition frequency of the counting pulses to be processed by the programmable backward counter 35 or 35' to be shorter than $\tau_4$, then the reverse counter 35 or 35' can by these pulses count away beyond its "0" count value without a drive signal for the downstream switches appearing at the output of the OR-gate 132. It is possible in this manner for the attainment of a freely selectable access to individual measuring units or individual selecting units outside the measuring cycle by way of the command lines 8 and 8' to emit a pulse packet which then brings only the switch arrangement of that selecting unit 25 or that measuring unit 5 to respond, the programmed initial count value m or n of which corresponds to the number of the pulses contained in this pulse packet.

On the other hand, with sufficiently slow driving, i.e. thus in the normal case, the output signals of the backward counter 35 or 35' are passed on though delayed, but unshortened so that the above mentioned condition remains observed, according to which particularly in the case of the measuring units 5, as gapless as possible a drive must be assured in order to avoid too strong a discharge of the measurement line 7.

What I claim is:
1. A measuring system comprising
    a central control unit which is adapted to control measuring cycles by generating and emitting encoded setting signals and encoded address signals, and by receiving and processing measuring signals,
    several measuring unit groups, each measuring unit group comprising a selecting unit and a plurality of measuring units, which, in an activated state, generate said measuring signals, and
    a cable connecting said central control unit with said selecting units and said measuring units and comprising a system voltage supply wire which is adapted to connect a power supply provided in said central control unit with electric and electronic components provided in said selecting units and said measuring units,
    a system ground wire connecting ground terminals of said selecting units and said measuring units with a system ground provided in said central control unit, command line wires on which said setting signals and said address signals are transmitted from said central control unit to said selecting units and said measuring units, and
    a system measurment line wire on which said measuring signals are transmitted from said measuring units back to said central control unit,
    wherein said central control unit is adapted to generate two different kinds of encoded address signals, namely encoded selecting unit address signals and encoded measuring unit address signals, and two different kinds of encoded setting signals, namely encoded selecting unit setting signals and encoded measuring unit setting signals, wherein said command line wires of said cable comprise at least two wires, namely a system command line wire on which said encoded address signals and said encoded setting signals are transmitted from said central control unit to all of said selecting units, and a group command line wire which is subdivided into a plurality of lengths, each of which is associated with a respective one of said measuring unit groups by connecting the selecting unit of the measuring unit group with all measuring units of this measuring unit group.
    wherein each of said selecting units is arranged remote from said central control unit, is integrated into said cable and comprises
    a selecting unit signal decoder having an input terminal which is connected with said system command line wire and receives therefrom said encoded address signals and said encoded setting signals, said selecting unit signal decoder being adapted to decode said encoded address signals and said encoded setting signals so that it generates decoded selecting unit address signals and decoded selecting unit setting signals upon receipt of the respective encoded signals, and that it discards said encoded measuring unit address signals and said encoded measuring unit setting signals,
    a first programmable selecting unit address recognition circuit which has a set input receiving said decoded selecting unit setting signals and an address input receiving said decoded selecting unit address signals, said first programmable selecting unit address recognition circuit being programmed to store a unique selecting unit address which is different from all other selecting unit addresses in said system, and being adapted to be set by said decoded selecting unit setting signals to an initial state starting from which it compares decoded selecting unit address signals received from said selecting unit signal decoder with its stored selecting unit address in order to generate a first selecting unit activation signal when a decoded selecting unit address signal coincides with its stored selecting unit address, and in order to terminate generation of said first selecting unit activation signal upon receipt of a further decoded selecting unit address signal which does not coincide with its stored selecting unit address,
    a first selecting unit switch arrangement comprising at least one controllable ON/OFF switch which is closed only when said first selecting unit activation signal is applied to its control input terminal, and which, in its closed state, connects a length of said group command line wire, which length is associated with the measuring unit group of the selecting unit, with said system command line wire, and wherein each of said measuring units is arranged remote from said central control unit, is integrated into said cable and comprises a measuring unit signal decoder having an input terminal which is connected with a length of said group command line wire being associated with the respective measuring unit group and receives therefrom said encoded address signals and said encoded setting signals when said ON/OFF switch of said first selecting unit switch arrangement in the selecting unit of the respective measuring unit group is closed, said measuring unit signal decoder being adapted to decode said encoded address signals and said encoded setting signals so that it generates decoded measuring unit address signals and decoded measuring unit setting signals upon receipt of the respective encoded signals, and that is discards said encoded selecting unit address signals and said encoded selecting unit setting signals, a programmable measuring unit address recognition circuit which has a set input receiving said decoded measuring unit setting signals and an address input receiving said decoded measuring unit address signals, said programmable measuring unit address recognition circuit being programmed to store a measuring unit address which is different for each of the measuring units belonging to the same measuring unit group, and being adapted to be set by said decoded measuring unit setting signals to an initial state starting from which it compares decoded measuring unit address signals received from said measuring unit signal decoder with said stored measuring unit address in order to generate a measuring unit activation signal when a decoded measuring unit address signal coincides with said stored measuring unit address, and in order to terminate generation of said measuring unit activation signal upon receipt of a further decoded measuring unit address signal which does not coincide with said stored measuring unit address, and a measuring unit switch arrangement comprising at least one controllable ON/OFF switch, which is closed only when said measuring unit activation signal is applied to its control input terminal, and which, in its closed state, allows a measuring signal, which is generated in the measuring unit, to be transmitted on said system measurement line wire back to said central control unit.

2. A measuring system according to claim 1, wherein at least one of said selecting units further comprises a second programmable selecting unit address recognition circuit which has a set input receiving said decoded selecting unit setting signals and an address input receiving said decoded selecting unit address signals, said second programmable selecting unit address recognition circuit being programmed to store an unique selecting unit address which is different from all other selecting unit addresses in said system, and being adapted to be set by said decoded selecting unit setting signals to an initial state starting from which it compares decoded selecting unit address signals received from said setting unit signal decoder with its stored selecting unit address in order to generate a second selecting unit activation signal when a decoded selecting unit address signal coincides with its stored selecting unit address, and in order to terminate generation of said second selecting unit activation signal upon receipt of a further decoded selecting unit address signal which does not coincide with its stored selecting unit address, and a second selecting unit switch arrangement comprising at least one controllable ON/OFF switch which is closed only when said second selecting unit activation signal is applied to its control input terminal, and which, in its closed state, connects a second end of a length of said group command line wire with said system commmand line wire, the first end of said length being connected with said system command line wire in the closed state of an ON/OFF switch of the first selecting unit switch arrangement of a different selecting unit.

3. A measuring system according to claim 2, wherein said cable comprises a group voltage supply wire which is subdivided into a plurality of lengths each of which is associated with a respective one of said groups of measuring units by connecting the pertinent selecting unit of the respective group with all measuring units of this group, and wherein said first and/or said second selecting unit switch arrangement further comprises a second controllable ON/OFF switch having a control input terminal to which said first or said second selecting unit activation signal, respectively, is applied in order to close and to open it in synchronism with said first controllable ON/OFF switch, said second controllable ON/OFF switch, in its closed state connecting the pertinent length of said group voltage supply wire with said system voltage supply wire.

4. A measuring system according to claim 3, wherein said cable comprises a group measurement line wire which is subdivided into a plurality of lengths each of which is associated with the respective one of said groups of measuring units by connecting the pertinent selecting unit of the respective group with all measuring units of this group, and wherein said first and/or said second selecting unit switch arrangement further comprises a third controllable ON/OFF switch having a control input terminal to which said first or said second selecting unit activation signal, respectively, is applied in order to close and to open it in synchronism with said first and said second controllable ON/OFF switches, said third controllable ON/OFF switch, in its closed state, connecting the pertinent length of said group measurement line wire with said system measurement line wire.

5. A measuring system according to claim 1 or 2, wherein said encoded selecting unit address signals generated by said central control unit comprise sequence of electrical pulses all having a first preselected pulse width in time, wherein each of said encoded selecting unit setting signals generated by said central control unit is an electrical pulse having a second preselected pulse width in time which is different from said first preselected pulse width, wherein said encoded measuring unit address signals generated by said central control unit comprise sequences of electrical pulses all having a third preselected pulse width in time which is different from said first and said second preselected pulse widths, wherein each of said encoded measuring unit setting signals generated by said central control unit is an electrical pulse having a preselected fourth pulse width in time which is different from said preselected first, second and third pulse widths, wherein each of said selecting unit signal decoders is a pulse width discriminator which responds to each of said encoded selecting unit address signal pulses by generating a selecting unit address signal pulse, and which responds to each of said encoded selecting unit setting signal pulses by generating a selecting unit setting pulse, wherein each of said first and second selecting unit programmable address recognition circuits is a programmable backward counter which, upon receipt of a selecting unit setting pulse is present to its programmed initial count value from which it starts counting backward said selecting unit address signal pulses which it receives from said selecting unit pulse width discriminator, said programmable backward counter generating said first or second selecting unit activation signal as long as it provides a count value "zero", wherein each of said measuring unit signal decoders is a pulse width discriminator which responds to each received encoded measuring unit address signal pulse by generating a measuring unit address signal pulse and which responds to each of said encoded measuring unit setting signal pulses by generating a measuring unit setting pulse, and wherein each of said measuring unit programmable address recognition circuits is a programmable backward counter which, upon receipt of a measuring unit setting pulse from said measuring unit pulse width discriminator, is preset to its programmed initial count value from which it starts counting backward said measuring unit address signal pulses which it receives from said measuring unit pulse width discriminator, said programmable backward counter generating said measuring unit activation signal as long as it provides a count value "zero".

6. A measuring system according to claim 5, wherein with respect to said encoded address and setting signals said predeterminable second pulse width is greater than said predeterminable first pulse width, wherein said predeterminable fourth pulse width is greater than said preterminable third pulse width and wherein said predeterminable first pulse width is greater than said predeterminable fourth pulse width.

* * * * *